(12) United States Patent
Sekiya

(10) Patent No.: US 10,887,881 B2
(45) Date of Patent: Jan. 5, 2021

(54) WIRELESS COMMUNICATION DEVICE FOR HIGH RELIABILITY COMMUNICATION AND METHOD THEREOF

(71) Applicant: KABUSHIKI KAISHA TOSHIBA, Tokyo (JP)

(72) Inventor: Masahiro Sekiya, Inagi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 22 days.

(21) Appl. No.: 16/296,102

(22) Filed: Mar. 7, 2019

(65) Prior Publication Data

US 2020/0084772 A1    Mar. 12, 2020

(30) Foreign Application Priority Data

Sep. 12, 2018   (JP) .................................. 2018-170729

(51) Int. Cl.
*H04W 72/04*    (2009.01)
*H04L 5/00*    (2006.01)
*H04W 88/08*    (2009.01)
*H04W 84/12*    (2009.01)

(52) U.S. Cl.
CPC ....... *H04W 72/0453* (2013.01); *H04L 5/0007* (2013.01); *H04W 84/12* (2013.01); *H04W 88/08* (2013.01)

(58) Field of Classification Search
CPC .......................... H04L 5/0007; H04W 72/0453
See application file for complete search history.

(56) References Cited

U.S. PATENT DOCUMENTS

| | | | |
|---|---|---|---|
| 2016/0081087 A1* | 3/2016 | Kwon | H04L 5/0082 370/329 |
| 2016/0150505 A1* | 5/2016 | Hedayat | H04L 69/22 370/329 |
| 2016/0227532 A1* | 8/2016 | Azizi | H04L 69/22 |
| 2016/0242195 A1* | 8/2016 | Kwon | H04B 7/0452 |
| 2016/0255610 A1* | 9/2016 | Li | H04L 1/0061 370/329 |

(Continued)

FOREIGN PATENT DOCUMENTS

JP    2016-208317 A    12/2016

OTHER PUBLICATIONS

"Part 11: Wireless LAN Medium Access Control (MAC) and Physical Layer (PHY) Specifications", IEEE Standards Association, IEEE Std 802.11™-2012.

(Continued)

*Primary Examiner* — Jael M Ulysse
(74) *Attorney, Agent, or Firm* — Foley & Lardner LLP

(57) ABSTRACT

According to one embodiment, a wireless communication device includes a transmission circuit and a processing circuit. The transmission circuit is configured to transmit a physical frame including a physical header and a physical payload. The physical header is transmitted in a frequency band. The physical payload includes data and is transmitted by using resource units which are parts of the frequency band. The processing circuit is configured to set a single destination for the data transmitted by a plurality of the resource units and set at least part of the data transmitted by the plurality of the resource units to same data content.

9 Claims, 25 Drawing Sheets

(56) References Cited

U.S. PATENT DOCUMENTS

| | | | |
|---|---|---|---|
| 2016/0295587 A1* | 10/2016 | Kwon | H04W 72/0446 |
| 2016/0309457 A1* | 10/2016 | Eitan | H04B 7/0426 |
| 2016/0330714 A1* | 11/2016 | Hedayat | H04W 72/1289 |
| 2016/0330742 A1* | 11/2016 | Li | H04B 7/0452 |
| 2017/0026969 A1* | 1/2017 | Rong | H04L 5/0044 |
| 2017/0033958 A1* | 2/2017 | Eitan | H04L 25/0202 |
| 2017/0094664 A1* | 3/2017 | Lee | H04L 5/0091 |
| 2017/0118316 A1* | 4/2017 | Lee | H04L 27/2626 |
| 2017/0150493 A1* | 5/2017 | Seok | H04B 7/0617 |
| 2017/0171723 A1* | 6/2017 | Adachi | H04L 5/0055 |
| 2017/0188390 A1* | 6/2017 | Adachi | H04L 1/008 |
| 2017/0265210 A1* | 9/2017 | Huang | H04W 72/0453 |
| 2017/0302417 A1 | 10/2017 | Chun | |
| 2017/0366329 A1* | 12/2017 | Cao | H04L 5/0094 |
| 2018/0331801 A1* | 11/2018 | Islam | H04L 5/0094 |
| 2020/0015234 A1* | 1/2020 | Li | H04W 72/042 |

OTHER PUBLICATIONS

"Part 11: Wireless LAN Medium Access Control (MAC) and Physical Layer (PHY) Specifications Amendment 4: Enhancements for Very High Throughput for Operation in Bands below 6 GHz", IEEE Standards Association, IEEE Std 802.11ac™-2013.

* cited by examiner

| TYPE | #1 | #2 | #3 | #4 | #5 | #6 | #7 | #8 | #9 |
|---|---|---|---|---|---|---|---|---|---|
| 0 | 26 | 26 | 26 | 26 | 26 | 26 | 26 | 26 | 26 |
| 1 | 52 | | 26 | 26 | 26 | 26 | 26 | 26 | 26 |
| 2 | 26 | 26 | 52 | | 26 | 26 | 26 | 26 | 26 |
| 3 | 52 | | 52 | | 26 | 26 | 26 | 26 | 26 |
| 4 | 26 | 26 | 26 | 26 | 26 | 52 | | 26 | 26 |
| 5 | 52 | | 26 | 26 | 26 | 52 | | 26 | 26 |
| 6 | 26 | 26 | 52 | | 26 | 52 | | 26 | 26 |
| 7 | 52 | | 52 | | 26 | 52 | | 26 | 26 |
| 8 | 26 | 26 | 26 | 26 | 26 | 26 | 26 | 52 | |
| 9 | 52 | | 26 | 26 | 26 | 26 | 26 | 52 | |
| 10 | 26 | 26 | 52 | | 26 | 26 | 26 | 52 | |
| 11 | 52 | | 52 | | 26 | 26 | 26 | 52 | |
| 12 | 26 | 26 | 26 | 26 | 26 | 52 | | 52 | |
| 13 | 52 | | 26 | 26 | 26 | 52 | | 52 | |
| 14 | 26 | 26 | 52 | | 26 | 52 | | 52 | |
| 15 | 52 | | 52 | | 26 | 52 | | 52 | |
| 16 | 52 | | 52 | | 26 | 106 | | | |
| 17 | 26 | 26 | | | 26 | 106 | | | |
| 18 | 52 | | 26 | 26 | 26 | 106 | | | |
| 19 | 26 | 26 | 26 | 26 | 26 | 106 | | | |
| 20 | 106 | | | | 26 | 52 | | 52 | |
| 21 | 106 | | | | 26 | 26 | 26 | 52 | |
| 22 | 106 | | | | 26 | 52 | | 26 | 26 |
| 23 | 106 | | | | 26 | 26 | 26 | 26 | 26 |
| 24 | 106 | | | | 26 | 106 | | | |
| 25 | 242 | | | | | | | | |

FIG. 2

EXAMPLE OF A PHY FRAME

EXAMPLE OF A MAC FRAME

EXAMPLE OF A TRIGGER FRAME

| RU SIZE | 26 TONE | 52 TONE | 106 TONE | 242 TONE | 484 TONE | 996 TONE |
|---|---|---|---|---|---|---|
| FIRST WIDTH | 0 | 37 | 53 | 61 | 65 | 67 |
| | 1 | | | | | |
| | 2 | 38 | | | | |
| | 3 | | | | | |
| | 4 | | | | | |
| | 5 | 39 | 54 | | | |
| | 6 | | | | | |
| | 7 | 40 | | | | |
| | 8 | | | | | |
| SECOND WIDTH | 9 | 41 | 55 | 62 | | |
| | 10 | | | | | |
| | 11 | 42 | | | | |
| | 12 | | | | | |
| | 13 | | | | | |
| | 14 | 43 | 56 | | | |
| | 15 | | | | | |
| | 16 | 44 | | | | |
| | 17 | | | | | |
| CENTER80 | 18 | | | | | |
| THIRD WIDTH | 19 | 45 | 57 | 63 | 66 | |
| | 20 | | | | | |
| | 21 | 46 | | | | |
| | 22 | | | | | |
| | 23 | | | | | |
| | 24 | 47 | 58 | | | |
| | 25 | | | | | |
| | 26 | 48 | | | | |
| | 27 | | | | | |
| FOURTH WIDTH | 28 | 49 | 59 | 64 | | |
| | 29 | | | | | |
| | 30 | 50 | | | | |
| | 31 | | | | | |
| | 32 | | | | | |
| | 33 | 51 | 60 | | | |
| | 34 | | | | | |
| | 35 | 52 | | | | |
| | 36 | | | | | |

FIG. 8

EXAMPLE OF A BLOCKACK FRAME

US 10,887,881 B2

WIRELESS COMMUNICATION DEVICE FOR HIGH RELIABILITY COMMUNICATION AND METHOD THEREOF

CROSS-REFERENCE TO RELATED APPLICATIONS

This application is based upon and claims the benefit of priority from Japanese Patent Application No. 2018-170729, filed on Sep. 12, 2018; the entire contents of which are hereby incorporated by reference.

FIELD

Embodiments described herein relate generally to a wireless communication device, a wireless communication method and a non-transitory storage medium.

BACKGROUND

Wireless LAN are used in various systems including sensor networks, networks for controlling infrastructure and networks for monitoring infrastructure. Examples of such infrastructure include electric power stations, factories and public transportation systems. For the sake of sustaining critical infrastructure and continuation of economic activities, stable operation of various networks used in the systems is required. Today, high reliability of data communication is essential for wireless LAN systems.

If data is received successfully in wireless LAN, a response frame (for example, an ACK frame or BlockACK frame) is returned to the wireless communication device which transmitted the data. If the wireless communication device which transmitted the data cannot receive the response frame, the data is retransmitted. Therefore, if the quality of propagation path is poor, transmission of the same data is repeated, degrading the overall performance of the wireless LAN.

BRIEF DESCRIPTION OF THE DRAWINGS

FIG. 2 is a table including example patterns of resource units;
FIG. 8 is a table describing examples of numbers allocated to each resource unit.

DETAILED DESCRIPTION

According to one embodiment, a wireless communication device includes a transmission circuit and a processing circuit. The transmission circuit is configured to transmit a physical frame including a physical header and a physical payload. The physical header is transmitted in a frequency band. The physical payload includes data and is transmitted by using resource units which are parts of the frequency band. The processing circuit is configured to set a single destination for the data transmitted by a plurality of the resource units and set at least part of the data transmitted by the plurality of the resource units to same data content.

Hereinafter, embodiments of the present invention will be described with reference to the drawings.

The entire contents of IEEE Std 802.11™-2012 and IEEE Std 802.11ac™-2013, known as the wireless LAN specification are herein incorporated by reference in the present specification.

Hereinafter, a description is given of embodiments of the present invention with reference to the drawings.

First Embodiment

Figure 1:
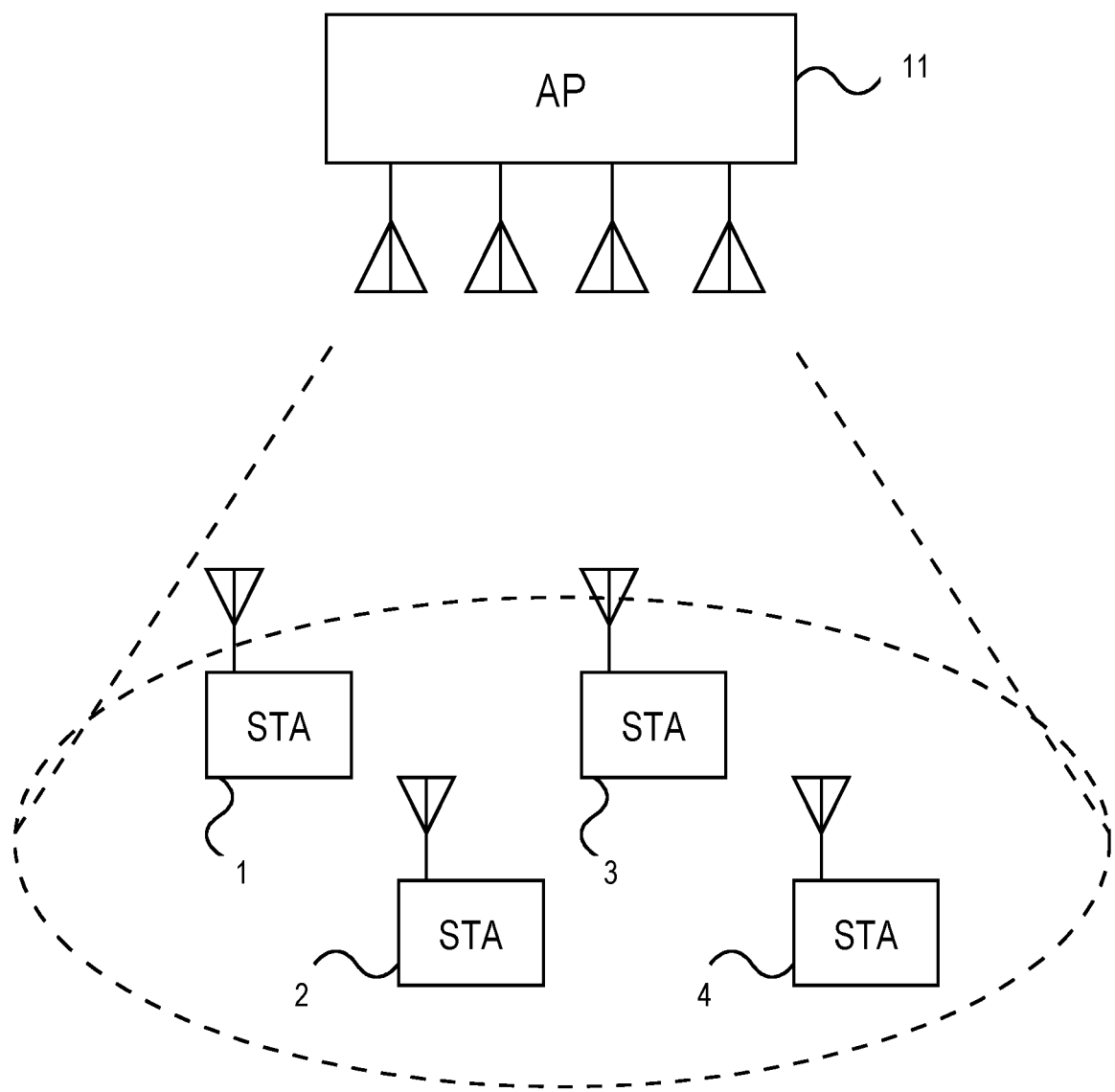
FIG. 1 is a diagram illustrating an example of a wireless communication system according to a first embodiment.

FIG. 1 is a diagram illustrating an example of a wireless communication system according to a first embodiment. The wireless communication system according to the first embodiment will be described with reference to FIG. 1.

The wireless communication system of FIG. 1 is a wireless LAN (Local Area Network) including an access point (AP) 11 which is a base station and a plurality of wireless terminals (STA) 1 to 4. The access point 11 can be a wireless communication device installed in a specific location. Also, the access point 11 can be a wireless communication device capable of operating as an access point or a wireless terminal, depending on the configured operation mode. The wireless terminals 1 to 4 can also be wireless communication devices capable of operating as an access point or a wireless terminal, depending on the configured operation mode.

Below, a wireless communication device operating as the access point may be referred as the first wireless communication device. The wireless communication device operating as the wireless terminal may be referred to as the second wireless communication device.

In the following, a wireless LAN is operating in infrastructure mode is described as an example. However, this does not exclude applications to ad hoc mode networks where a plurality of wireless communication device communicates directly with each other without using the base station. Then, either of the wireless communication devices can operate as the owner of the ad hoc mode network.

The access point 11 is a wireless communication device which has DL (Downlink) OFDMA (Orthogonal Frequency Division Multiple Access) communication capability. The wireless terminals 1 to 4 are wireless communication devices capable of receiving DL OFDMA and transmitting UL OFDMA. Details of DL OFDMA and UL OFDMA are described later.

If OFDM (Orthogonal Frequency Division Multiplexing) is used in wireless communication, the frequency band is divided into a plurality of subcarriers. Each subcarrier is used to transmit data concurrently in the frequency domain. In OFDM, each subcarrier is orthogonal to each other. Therefore, it is possible to allocate subcarriers densely, utilizing the frequency band effectively. For example, it is possible to use a plurality of 20 MHz-width subcarriers to transmit data of a single user.

If OFDMA (Orthogonal Frequency Division Multiple Access) is used in wireless communication, resource units (RUs) which are sets including a plurality of subcarriers are defined in the frequency band. In other words, resource units are parts of the frequency band. In each resource unit, a single user can be assigned. By defining a plurality of resource units in the subcarriers, it is possible to transmit data belonging to different users, concurrently. If OFDMA is transmitted from the access point to the wireless terminal, it is called a DL OFDMA. If OFDMA is transmitted from the wireless terminal to the access point, it is called a UL OFDMA.

The RU allocation is information including the frequency bandwidth of each resource unit or the number of subcarriers in each resource unit and the assignment of the resource units which are used. Thus, the RU allocation includes information on the patterns of resource units which are used in wireless communication. The access point can select the RU allocation which is used during communication of data by OFDMA. The table in FIG. 2 shows examples of RU allocations.

In the table of FIG. 2, the number of consecutive subcarriers used by a single resource unit (the tone) is either 26, 52, 106 or 242. The table of FIG. 2 includes 26 patterns from TYPE=0 to TYPE=25.

(Example of an Access Point)

Figure 3:
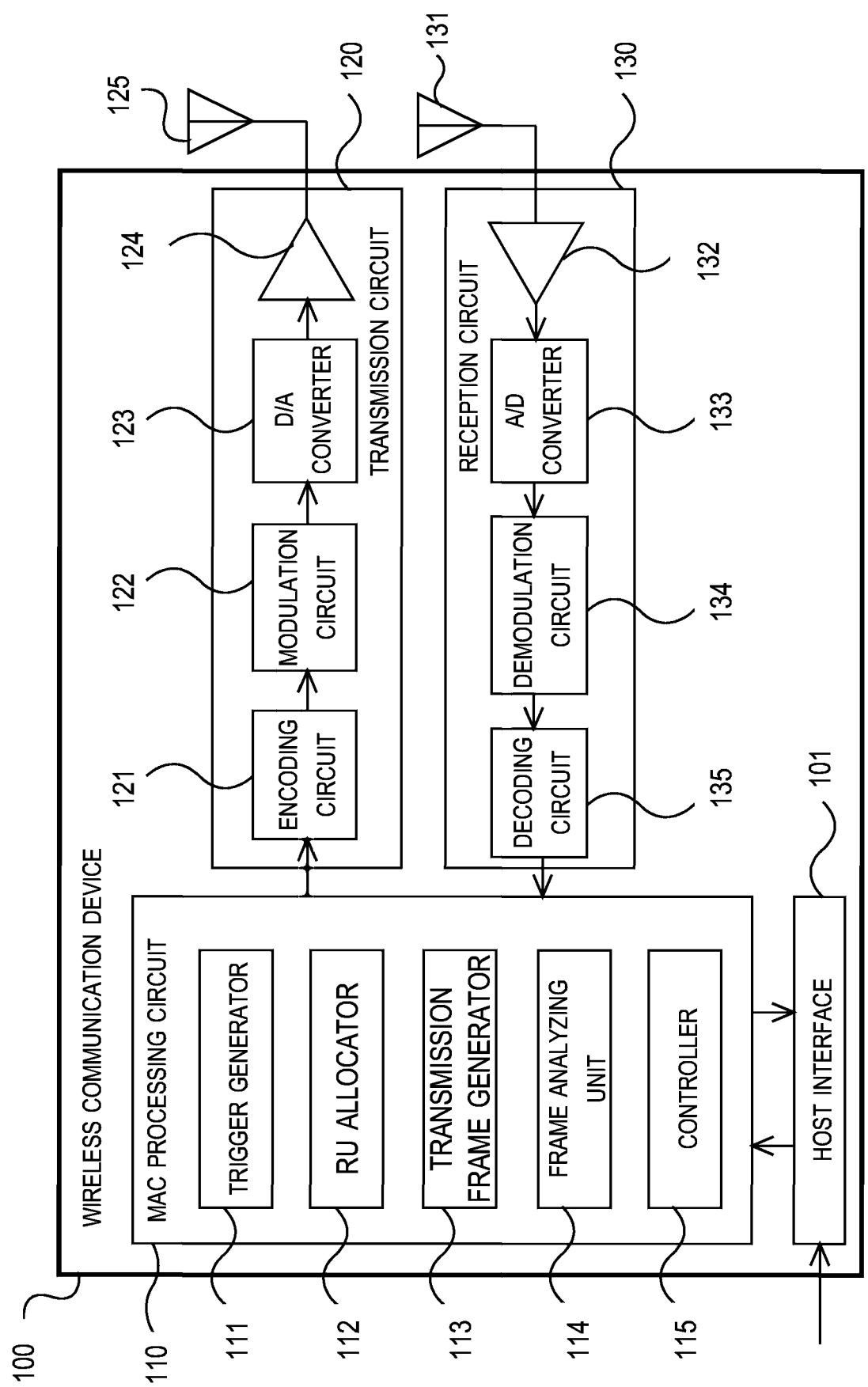
FIG. 3 is a block diagram presenting an example of a wireless communication device according to the first embodiment.

FIG. 3 is a block diagram presenting an example of a wireless communication device according to the first embodiment. The wireless communication device 100 in FIG. 3 corresponds to the access point 11 in FIG. 1. Details of the wireless terminals 1 to 4 are described later. In the following the wireless communication device 100 is explained in reference to FIG. 3.

The wireless communication device 100 in FIG. 3 executes data communication compliant to wireless LAN standards such as IEEE802.11 series or their successor standards. Examples of IEEE802.11 series standards include IEEE802.11a, IEEE802.11b, IEEE802.11g, IEEE802.11n, IEEE802.11ac and IEEE802.11ax. Wireless LAN is only one of the examples of communication standards the wireless communication device 100 can use. Thus, the wireless communication device 100 may use any other communication standard.

The wireless communication device 100 includes a host interface 101, a MAC processing circuit 110, a transmission circuit 120, and a reception circuit 130. The MAC processing circuit 110 includes a trigger generator 111, a RU allocator 112, a transmission frame generator 113, a frame analyzing unit 114 and a controller 115 as internal components. The transmission circuit 120 includes an encoding circuit 121, a modulation circuit 122, a D/A converter 123, a transmission amplifier 124 and an antenna 125 as internal components. The reception circuit 130 includes an antenna 131, a low-noise amplifier 132, an A/D converter 133, a demodulation circuit 134 and a decoding circuit 135 as internal components.

The host interface 101 enables communication of data between the wireless communication device 100 and a computer in a host side. Examples of the host interface 101 include, PCI Express, USB, UART, SPI, SDIO and Ethernet. However, any type of interface can be used. Examples of the computer in the host side include smartphones, tablets, PCs, servers, control oriented microcomputers, printers, digital cameras, video cameras, robots or in-vehicle information systems. However, different devices are usable as long as they include a processor (a CPU).

The host interface 101 transfers data received from the computer to the MAC processing circuit 110. Also, the host interface 101 transfers data received from the MAC processing circuit 110 to the computer.

The MAC processing circuit 110 executes processes which correspond to the MAC layer (Media Access Control Layer). These processes include conversion of transmitted data to MAC frames, configuration of received data from the received MAC frames, controlling the duration of MAC frames, generation of control frames and configuration of control information in MAC frames. Also, the MAC processing circuit 110 includes a transmission queue. By referring to the transmission queue, it is possible to confirm whether there is data in transmission waiting state. If the MAC processing circuit 110 finds data in transmission waiting state or determines that transmission of control frames is necessary, physical headers are configured. Then, the MAC processing circuit 110 transfers the physical headers to the transmission circuit 120. Also, the MAC processing circuit 110 executes various processes based on the information stored in the physical header of the physical frame which is transferred from the reception circuit 130.

The transmission circuit 120 transmits data by using the antenna 125. The reception circuit 130 receives data by using the antenna 131. The MAC processing circuit 110 is an example of a processing circuit.

Next, internal components of the transmission circuit 120 are explained. The encoding circuit 121 encodes the transmitted signal provided from the MAC processing circuit 110, which is in MAC frame format. Examples of the MAC frames include a data frame and a control frame. BA (BlockACK), ACK and CTS (Clear to Send) are examples of the control frames. Various block codes and convolutional codes are selectable for the encoding scheme. However, any type of encoding scheme (method) can be used.

The modulation circuit 122 modulates digital signals provided from the encoding circuit 121. Examples of modulation schemes include FSK (Frequency Shift Keying), BPSK and QAM. However, the modulation scheme used is not limited. The D/A converter 123 converts digital signals to analog signals. The transmission amplifier 124 amplifies the analog signal converted by the D/A converter 123. Then, the amplified signal is transmitted from the antenna 125.

The transmission circuit 120 may include components which execute frequency conversion. Examples of such components are mixers and local oscillators. The transmission circuit 120 can up-convert analog signals which are in baseband frequency to radio frequency. The transmission circuit 120 may include filters such as low-pass filters, band-pass filters or notch filters.

The antenna 125 transmits radio signals to other wireless communication devices. Here, frequencies of signals transmitted by the antenna and frequencies of signals received by the antenna are called the radio frequency. For example, 2.4 GHz bands or 5 GHz bands are can be selected as the radio frequency. However, the selectable band of frequency is not limited. Also, the configuration and shape of the antenna 125 is not limited.

Next, internal components of the reception circuit 130 are explained.

The antenna 131 receives radio signals transmitted from other wireless communication devices. The configuration and the form of the antenna 131 are not limited. The low-noise amplifier 132 amplifies the received signals which are analog signals. The A/D converter 133 converts received signals from analog signals to digital signals. The demodulation circuit 134 demodulates the received signals which are converted to digital signals. In the demodulation process, synchronization of OFDM symbol timings, Fourier transformations such as the FFT (Fast Fourier Transform) are executed. The decoding circuit 135 decodes the received signals which are digital signals and converts the signals to MAC frame format. Examples of decoding process include de-interleaving and the decoding of error correction codes. Finally, the received signals converted to MAC frame format is transferred to the MAC processing unit 110.

The reception circuit 130 may include components which execute frequency conversion. Examples of such components are mixers and local oscillators. The radio frequency signal can be down-converted to analog signals in baseband frequency. The reception circuit 130 may include filters such as low-pass filters, band-pass filters and notch filters.

The modulation circuit 122 and the demodulation circuit 134 executes modulation processes and demodulation processes by referring to information indicating the frame length, information indicating the transmission rate or information indicating the frequency band stored in a PHY (Physical) header. The demodulation circuit 134 notifies information including the conditions of modulation and demodulation to the MAC processing circuit 110. Similarly, the encoding circuit 121 and the decoding circuit 135 can execute encoding processes and decoding processes by referring to information stored in the PHY (Physical) header. The decoding circuit 135 may notify the decoding condition to the MAC processing circuit 110.

The wireless communication unit 100 may execute modulation processes, demodulation processes or encoding processes based on IEEE802.11 (wireless LAN) standards.

Next, components included in the MAC processing circuit 110 are described.

The trigger generator 111 generates Trigger frames. Trigger frames are used to specify a wireless terminal or a plurality of wireless terminals which should transmit data to the access point by using UL OFDMA. The Trigger frames may include configuration data used by each wireless terminal for transmitting frames by UL OFDMA and information on the operations each wireless terminal should execute. Details of the Trigger frames are described later.

The RU allocator 112 determines the RU allocation used for transmission of data by OFDMA. Also, the RU allocator 112 determines the resource unit used for transmitting data for each wireless terminal. The RU allocator 112 can determine whether the same data is transmitted by using a plurality of resource units. Details of the process executed by the RU allocator 112 are described later.

The transmission frame generator 113 generates frames with the specified configurations. Specifically, the transmission frame generator 113 generates frames of DL OFDMA by using the RU allocation determined by the RU allocator 112 and information on the resource units used for transmitting data to each wireless terminal.

The frame analyzing unit 114 refers to the data stored in the frames and obtains necessary information. The frame analyzing unit 114 refers to fields in the header or the body of the frames, obtaining information such as the destination of the frame and the type of the frame. Also, the frame analyzing unit 114 refers to the data stored in the received frames and calculates the CRC. CRC is an example of an error detection code. The frame analyzing unit 114 may use other error detection codes. Also, the frame analyzing unit 114 can use error correction codes to verify whether data has been received correctly.

The controller 115 controls each component of the wireless communication device 100. The controller 115 executes processes necessary for transmission of data and reception of data. For example, if a received frame is transferred from the decoding circuit 135 to the MAC processing circuit 110, the controller 115 instructs the frame analyzing unit 114 to calculate the CRC of the corresponding frame. If the calculated CRC matches the CRC calculated in the source device, the controller 115 instructs the RU allocator 112 to generate frames including acknowledgement information (for example, ACK frames). Then, the controller 115 transfers the ACK frame to the encoding circuit 121. The transmission of the ACK frame can be started in the specified timing.

The controller 115 can manage the Association IDs (AIDs) of each wireless terminal. Also, the controller 115 determines the parameters of the physical layer. The parameters of the physical layer are stored in the physical header.

The components of the wireless communication device 100 including the MAC processing circuit 110, the transmission circuit 120, the reception circuit 130 and the host interface 101 can be implemented by hardware circuits including semiconductor circuits, FPGA, PLD, and ASIC. The components of the wireless communication device 100 can be implemented by programs operating on processors. Also, each component of the wireless communication device 100 can be implemented by combinations of the above.

The configuration of the wireless communication device 100 in FIG. 3 is only an example. Thus, the configuration of the wireless communication device can be different. For example, the wireless communication device 100 can be a superheterodyne receiver, Low-IF (Low-Intermediate Frequency) type device, a sliding IF type device or a digital PLL type device. However, the type of wireless communication device is not limited to the types which are mentioned above.

The wireless communication device 100 in FIG. 3 has separate antennas for transmission of data (antenna 125) and reception of data (antenna 131). Therefore, the wireless communication device 100 can execute both half-duplex communication and full-duplex communication. However, the same antenna can be shared for both the transmission and reception of data. Although the wireless communication device 100 in FIG. 3 has two antennas, the number of antennas is not limited.

Figure 4:
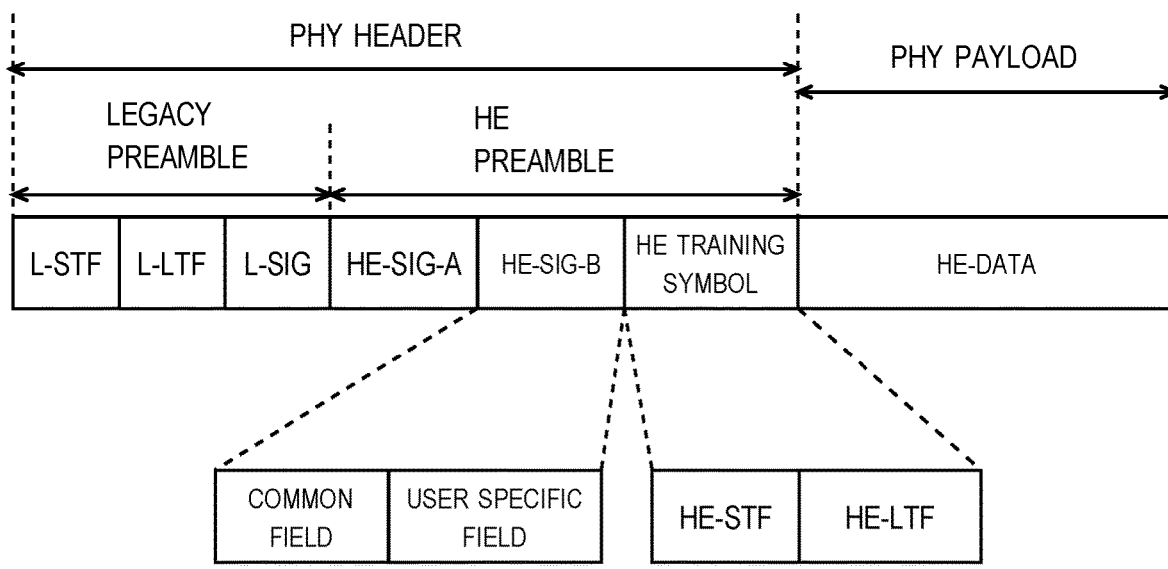
FIG. 4 is an example of a DL OFDMA physical frame.

FIG. 4 is an example of a DL OFDMA physical frame. The physical frame includes a physical header (PHY header) and a physical payload (PHY payload). The physical header includes the Legacy Preamble part and the HE Preamble part. The "H" and "E" in HE Preamble are the capital letters of High Efficiency, implying that it is the part of preamble defined in the IEEE 802.11ax standard or the successor standards. The PHY payload stores data of the MAC frame after the OFDM modulation process.

The Legacy Preamble includes physical header fields defined in the IEE 802.11a standards. Examples of such fields include L-STF (non-HT Long Training field), L-LTF (non-HT Short Training field) and L-SIG (non-HT Signal field). The L-STF and L-LTF include predetermined bit patterns. The predetermined bit patterns are used for: adjusting the power of wireless signals; synchronization of transmission and reception; and channel estimation. L-SIG includes information used by the wireless communication device in the receiving side to calculate the duration of the HE Preamble and the physical payload.

The standardization of the HE Preamble is being discussed in the standardization of IEEE802.11ax. The HE Preamble in the example of FIG. 4 includes a HE-SIG-A (HE Signal A) field, a HE-SIG-B (HE Signal B) field and a HE Training Symbol field. The HE-SIG-B field of the HE Preamble exists when the physical frame is a MU frame. Therefore, there are cases when the HE Preamble does not include the HE-SIG-B field. Details of the MU frame are described later.

The HE-SIG-A field includes the attribute of the physical frame corresponding to the DL OFDMA. For example, the HE-SIG-A field can include information indicating whether the physical frame is an Uplink (UL: frames transmitted from the wireless terminal to the access point) or a Downlink (DL: frames transmitted from the access point to the wireless terminal).

The wireless communication device which receives the physical frame of FIG. 4 refers to both the L-SIG in the Legacy Preamble and the HE-SIG-A to determine whether the format of the corresponding physical frame is a SU (Single User) frame or a MU (Multi User) frame.

The SU frame is a physical frame with a single wireless terminal configured as the destination. The MU frame is a physical frame with a plurality of wireless terminals configured as the destination or a physical frame transmitted simultaneously by a plurality of wireless terminals. Examples of physical frames with a plurality of wireless terminals configured as the destination include OFDMA and MU-MIMO.

If the physical frame is a MU frame including a HE-SIG-B field, the HE-SIG-A field includes information indicating the data transfer rate and the length of the HE-SIG-B field. Examples of information indicating the data transfer rate include MCS (Modulation and Scheme). Examples of information indicating the length of fields include the number of OFDM symbols.

Also, other information including the frequency bandwidth used by the physical frame (for example, 20 MHz, 40 MHz and 80 MHz), the length of the Guard Interval used in the physical payload (for example, 0.8 us, 1.6 us and 3.2 us) and the BSS (basic service set) of the wireless LAN provided by the access point may be stored in the HE-SIG-A field. Examples of the BSS include the whole set of MAC addresses used by the access point or a part of the set of MAC addresses used by the access point.

HE-SIG-B field includes a Common field and a User Specific field. The Common field stores the RU allocation information used during the transmission of data by OFDMA. The RU allocation information provides information of resource units for each 20 MHz frequency bandwidth. Therefore, if OFDMA physical frames are transmitted by using the 80 MHz frequency bandwidth, the Common field includes 4 sets of RU allocation information.

Thus, the processing circuit of the wireless communication device according to the embodiment can configure a third field in the physical header. Here, the third field includes the frequency bandwidth of the resource units (RUs) or the number of subcarriers included in the resource unit and the assignment of resource units. The Common field mentioned above is an example of the third field.

Figure 5:
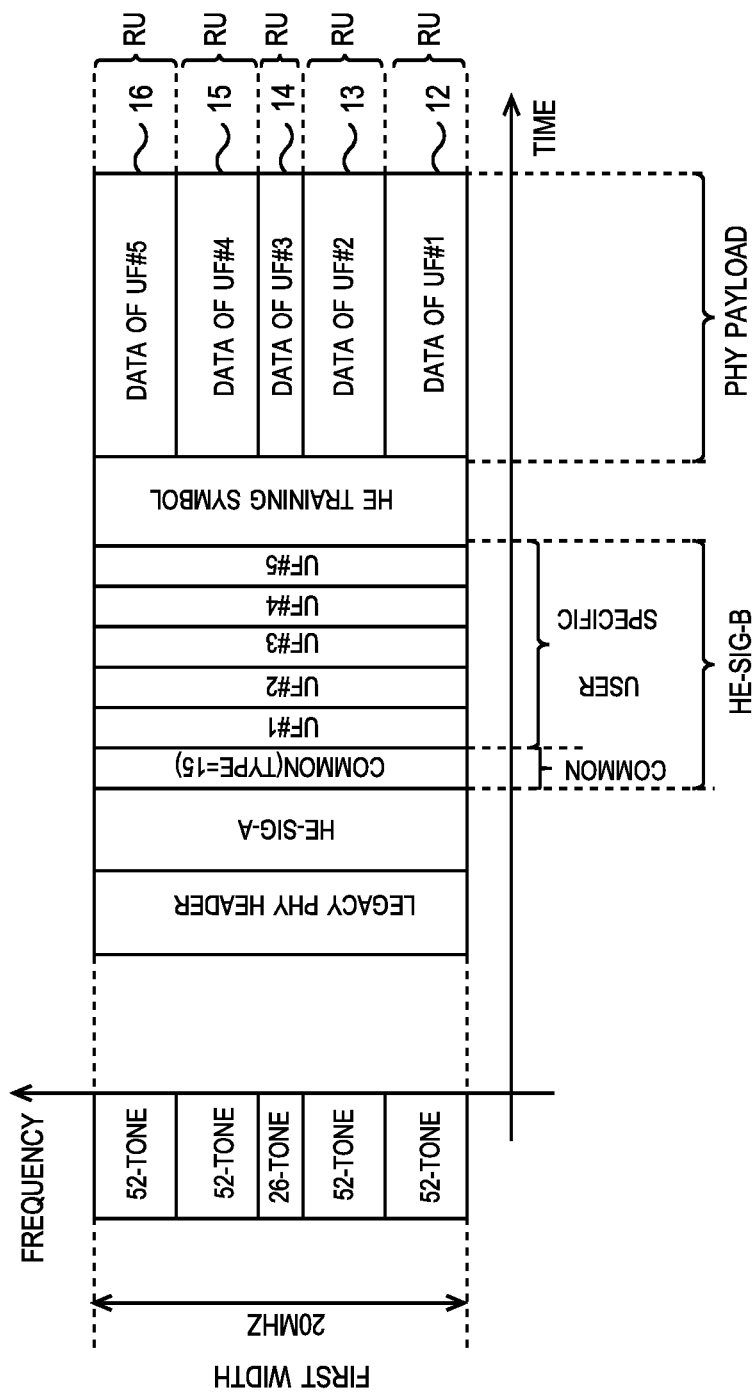
FIG. 5 is a diagram showing an example of the relation between User fields and resource units.

The User Specific field includes at least one User field (UF). In the following, the relation between the User field and the resource units are explained in reference to FIG. 5. In the example of FIG. 5, TYPE=15 is stored in the Common field. Therefore, in FIG. 5 shows an example of a physical frame with RU allocation TYPE=15. The vertical axis of FIG. 5 indicates the frequency. The horizontal axis of FIG. 5 indicates the time.

The physical frame of FIG. 5 includes RU12, RU13, RU14, RU15 and RU16. Here, the RUs are listed in the order of ascending frequency bands. The width of RU12, RU13, RU15 and RU16 are 52 tones. The width of RU 14 is 26 tones. Here, the tone indicates the number of subcarriers. In the example of FIG. 5, five User fields including UF #1 to UF #5 are shown. Each User field includes information of either of the resource units. Examples of information of resource units include identifiers of the destination wireless terminal and the data transfer rate of the resource unit. It is possible to use the AID (Association ID) assigned from the access point as an identifier of the wireless terminal. Examples of the data transfer rate of the resource unit include the number of streams and MCS (Modulation and Scheme).

Therefore, the processing circuit (MAC processing circuit 110) configures a plurality of first fields in the physical header. Each first field specifies the destination for either of the resource units included in the frequency band. The User field mentioned above is an example of the first field. One example of methods which can be used for specifying the destination of the resource unit is by using the AID (Association ID) as the identifier of the destination wireless communication device. However, fields other than the User field can be used as the first field. The destination of the resource units can be specified by using methods other than the use of assigned AIDs.

The order that the User fields are aligned in the User Specific field corresponds to the order each of the resource units are aligned in the frequency domain of the physical payload. In the following, a User field (first field) corresponding to a resource unit specifies destination of the resource unit. In the physical frame of FIG. 5, UF #1 corresponds to RU12. UF #2 corresponds to RU13. UF #3 corresponds to RU14. UF #4 corresponds to RU15. UF #5 corresponds to RU16. Thus, the User fields is transmitted in the earlier timeframes corresponds to the resource units in the lower frequency band.

However, the relation described above is only an example. Therefore, it is possible to use different relations. For example, it is possible specify the identifier of subcarriers or range of subcarriers corresponding to the resource unit, in the User field. Also, it is possible to specify the resource unit by storing frequency bands in the User field. It is possible to specify the resource unit by storing the offset frequency from a base frequency in the User field.

The wireless terminal which receives the physical header can specify the resource unit the corresponding wireless terminal should receive based on the alignment of User field (first field) storing the identifier of the corresponding wireless terminal, within the User Specific field.

Both the Common field and User field can include CRCs (Cyclic Redundancy Codes). By using the CRCs, the wireless terminal in the receiving side can verify whether each field is received successfully. For example, it is possible to assign a single CRC for the Common field. Also, two User fields which are transmitted consecutively can share a single CRC.

As illustrated in FIG. 4, the HE Training Symbol field includes a HE-STF (HE Short Training field) and a HE-LTF (HE Long Training field). Both the HE-STF and HE-LTF can be used for: adjusting the power of wireless signals; synchronization of transmission and reception of data; and channel estimation.

Figure 6:
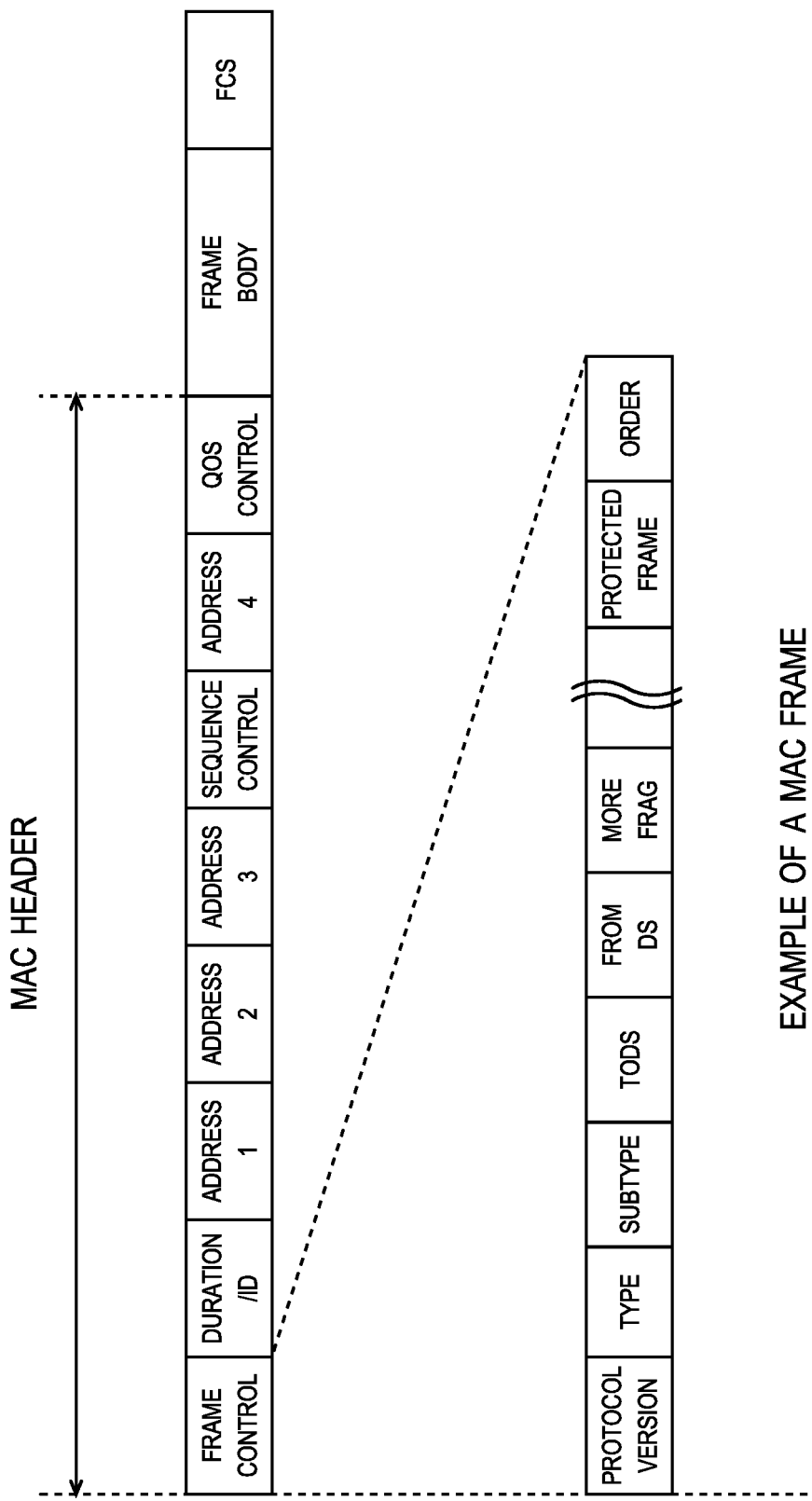
FIG. 6 is an example of a MAC frame format defined in IEEE 802.11.

FIG. 6 is an example of a MAC frame format defined in IEEE 802.11. In IEEE802.11 series, wireless LAN standards such as IEEE802.11a, IEEE802.11b, IEEE802.11g, IEEE802.11n, IEEE802.11ac, IEEE802.11ax or successor standards are defined.

The MAC frame includes a MAC Header part, a Frame Body part and a Frame Check Sequence (FCS) part. In the MAC Header part, information necessary for the reception process of the MAC layer is configured. In the Frame Body part, various data payloads are stored depending on the type of frames. In the FCS part, the CRC (Cyclic Redundancy Code) used for confirmation of acceptance of the MAC Header part and Frame Body part is stored.

The MAC Header part includes a Frame Control field, a Duration/ID field, a plurality of Address fields and a Sequence Control field. If the MAC frame is a QoS Data frame, the MAC Header part includes a QoS Control field.

The Frame Control field includes a Type field, a Sub type field, a To DS field, a From DS field, a more fragment field, a protected frame field and an order field.

In the Type field, information which identifies the frame type of the MAC frame is stored. Frame types include control frames, management frames and data frames. In the Subtype field, information which identifies the type of MAC frame within each frame type is stored. In the To DS field, information which identifies whether the destination device is a wireless base station or a wireless terminal is stored. In the From DS field, information which identifies whether the source device is a wireless base station or a wireless terminal is stored.

The more fragment field is used in cases when the data payload in the Frame Body part is fragmented. The more fragment field indicates whether there are frames which store subsequent fragments of data. The protected frame field stores information which indicates whether the MAC frame is in protected state or not. In the order field, information which indicates whether the order of the MAC frames should not be altered or not, when the MAC frames are delayed is stored.

In a Duration/ID field, the period to wait until execution of transmission process (NAV: Network Allocation Vector) or the identification number allocated to the wireless terminals connecting to the access point is stored. The length of the Duration/ID field is 16 bits. If the most significant bit (MSB) is zero, the Duration (NAV) is stored in the remaining 15 bits. If the most significant bit is one, the ID (identification number) is stored in the remaining 15 bits.

In the Address1 field, the MAC address of the wireless communication device which directly receives the MAC frame is configured. Each wireless communication device refers to the Address1 field to confirm whether the destination of the MAC frames is configured to the own device.

In the Address1 field, the MAC address of the wireless communication device which received the MAC frame previously is stored. In the Address3 field, the MAC address of the final destination wireless communication device is stored in the case of uplink communication. In the case of downlink communication, the MAC address of the source wireless communication device is stored.

In the Sequence Control field, the sequence number of the transmitted data or the fragment number of fragmented data is stored. The Address4 field exists only when a MAC address is transmitted from a wireless base station to another wireless base station. In the Address4 field, the MAC address of the source wireless communication device is stored.

If the MAC frame is a QoS data frame (type of data frame), the corresponding MAC frame includes a QoS Control field. First, the wireless communication device refers to the Type field of the MAC frame to confirm whether the MAC frame is a data frame. If the MAC frame is a data frame, the value configured in the Subtype field is confirmed to determine whether the MAC frame is a QoS Data frame or a non-QoS Data frame.

The QoS Control field includes a TID field and an ACK policy field. In the TID field, either of the integers from 0 to 15 is configured depending on the type of data traffic. Each wireless communication device determines the type of data traffic by referring to the TID field. In the ACK policy field, the method used in confirmation of delivery is stored. Each wireless communication device determines whether the QoS Data frame is transmitted with Normal ACK policy setting, BlockACK policy setting or No ACK policy setting.

For example, if a QoS Data frame is transmitted with Normal ACK policy setting, the wireless communication device which received the corresponding QoS Data frame has to respond by transmitting a response frame in highest priority.

The configuration of the MAC frame and the MAC header of FIG. 6 is only an example. For example, the QoS Control field mentioned above was added in the IEEE802.11e standard. Thus, in new standards, new fields may be added to the MAC header. Also, the usage of the fields may change.

Figure 7:
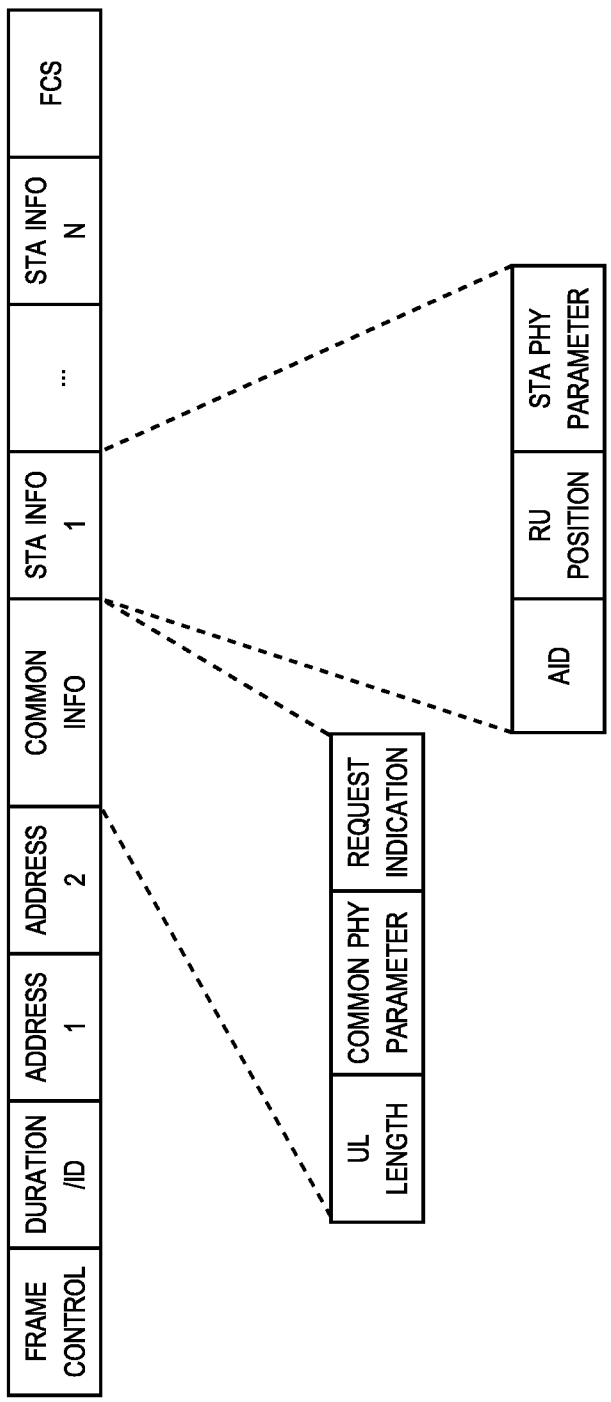
FIG. 7 is an example of a Trigger frame.

FIG. 7 is an example of a Trigger frame. The contents and the roles of the Frame Control field, the Duration/ID field, the Address1 field and the Address2 field are mentioned in the above description of MAC frame (FIG. 6). In Trigger frames, the value of Type subfield in the Frame Control field is "01". In Trigger frames, bit strings "0010" are stored in the SubType subfield.

In the Address 1 field, the MAC address of the wireless terminal the access point permits the transmission of UL OFDMA is stored. However, if the Trigger frame includes a plurality of STA Info fields, the broadcast MAC address is stored in the Address1 field. Information of the source wireless communication device is stored in the Address2 field. If the access point is the source wireless communication device of the frame, the MAC address of the access point is configured.

The Common Info field stores configuration data which is used commonly by a plurality of wireless terminals which transmit frames by UL OFDMA. For example, it is possible set the duration of frames each wireless terminal transmits by UL OFDMA in the UL Length subfield of the Common Info field. The duration of the frames can be configured in units of microseconds. Also, the duration of the frames can be configured by using values which are multiples of 16 microseconds. Also, data used for calculating the duration of the frames can be stored in the UL Length subfield. One example of such data is the number of bytes in the transmitted data. By using the UL Length subfield, the ends of the frames transmitted by each wireless terminal can be aligned to the same timing.

In the Common PHY parameter subfield of the Common Info field, physical layer parameters which are commonly used by a plurality of wireless terminals which transmit frames by UL OFDMA are stored. Examples of physical layer parameters include frequency bandwidth (for example, 20 MHz, 40 MHz and 80 MHz) and the Guard Interval of physical payloads.

In the Request Indication subfield of the Common Info field, the action requested to the wireless terminal which receives the Trigger frame of FIG. 7 is stored. The access point which transmits the Trigger frame may determine the actions requested to each wireless terminal. Examples of the requested actions include: transmission of data; transmission of response frames including ACK frames and BlockACK Frames; and reporting the amount of data in transmission waiting state. By referring to the Request Indication subfield, each wireless terminal can determine whether data frames can be transmitted to the access point or not.

In the STA Info field, configuration data for each wireless terminal which transmits frames by UL OFDMA is stored. Therefore, if a Trigger frame triggers a plurality of wireless terminals, the number of STA Info fields would be equal to the number of the triggered wireless terminals. In the Trigger frame of FIG. 7, the number of triggered wireless terminals is N. Thus, N STA Info fields are prepared.

In the AID subfield of the STA Info field, the Association ID (AID) is stored. The access point assigns identifiers which are generated locally in the network, when the access point grants the permission to connect for wireless terminals which request the establishment of connections to the network. In such cases, the access point can use the AID as the identifiers generated locally in the network. Generally, AIDs are numbers other than 0.

The RU position subfield in the STA Info field stores information used by the wireless terminals to specify the resource unit which can be used for transmission of data. For example, in order to specify the frequency bandwidth of the resource unit, the identifiers (IDs) shown in the table of FIG. 8 can be used. The table of FIG. 8 stores 68 different resource units (ID=0 to ID=67). The resource unit of ID=0 is located in the lowest frequency band. The bandwidth for resource unit of ID=0 is 26-tones (26 subcarriers). The resource unit of ID=67 has a bandwidth of 996-tones (996 subcarriers).

In the table of FIG. 8, the assigned frequency band becomes higher in the order of the first width, the second width, the third width and the fourth width. Here, a "width" indicates a frequency bandwidth of 20 MHz. However, this value is only an example. Thus, different values can be used as the "width". "Center80" is used in cases when the bandwidth configured in the Common PHY parameter subfield is 80 MHz. The "width" can be a channel of wireless LAN.

Thus, by referring to the RU position subfield of the received Trigger frame, the wireless terminal can specify the part of the frequency band (the resource unit) which can be used for transmission of data.

In the STA PHY parameter subfield of the STA Info field, the physical layer parameters used by the wireless terminal for transmitting frames by UL OFDMA are stored. Examples of the physical layer parameters include MCS (Modulation and Code Scheme), NSTS (Number of Space Time Streams), the type of error correction code which is used (for example, LDPC) and transmit power information. Here, the MCS indicates the data transfer rate. By using the transmit power information, it is possible to control the powers of signals transmitted from each wireless terminal to approximately equal values, upon reception in the access point.

Figure 9:
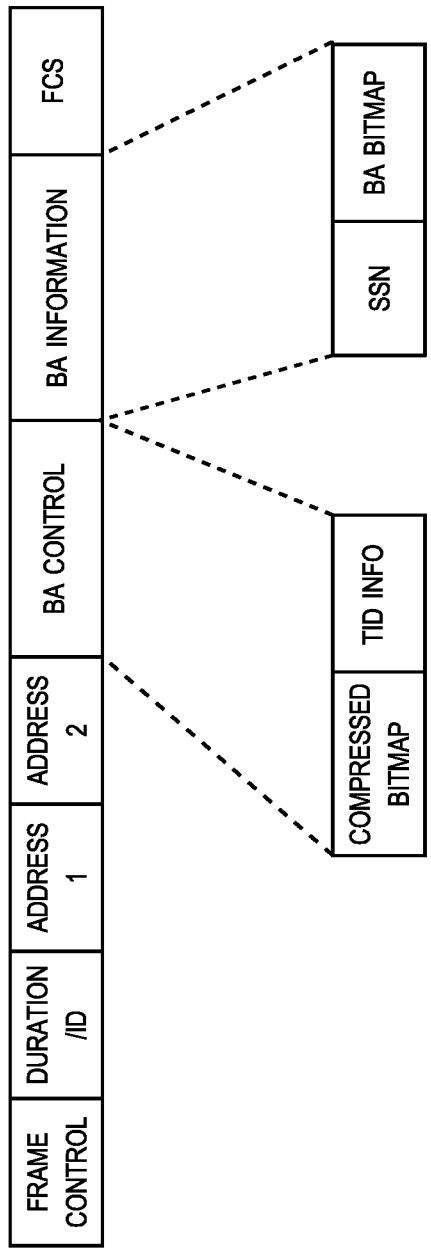
FIG. 9 is an example of a BlockACK frame.

FIG. 9 is an example of a BlockACK frame. The contents and the roles of the Frame Control field, the Duration/ID field, the Address1 field and the Address2 field are mentioned in the above description of MAC frame (FIG. 6). In BlockACK frames, the value of Type subfield in the Frame Control field is "01". In BlockACK frames, bit strings "1001" are stored in the SubType subfield.

In the Address 1 field, the MAC address of the wireless terminal which is the destination of the BlockACK frame is stored. For example, the wireless terminal transmits a BlockACK frame to the access point, the MAC address of the access point is stored in the Address1 field. Information of the source wireless communication device is stored in the Address2 field. If the wireless terminal is the source wireless communication device of the frame, the MAC address of the wireless terminal is configured.

The BA Control field includes at least the Compressed Bitmap subfield and the TID Info subfield. The Compressed Bitmap subfield stores information indicating whether the length of the BA Bitmap subfield is being shortened or not. The TID Info subfield stores the Traffic ID (TID) of the BA Bitmap subfield. Therefore, confirmation of delivery (acknowledgement) for the data frame with the Traffic ID specified in the TID Info subfield is stored in the BA Bitmap subfield.

The BA Information field includes the SSN (Starting Sequence Number) subfield and the BA Bitmap subfield. The SSN subfield stores the frame sequence number of the acknowledgement information corresponding to the most significant bit of the BA Bitmap subfield.

The BA Bitmap subfield stores the acknowledgement information corresponding to each data frame transmitted by the access point. Each of the data frames correspond to a single bit in the BA Bitmap subfield. For example, if the wireless terminal successfully receives a data frame, the corresponding bit in the BA Bitmap subfield is set to "1". If the wireless terminal cannot receive the data frame successfully, the corresponding bit in the BA Bitmap subfield is set to "0".

The length of the BA Bitmap subfield is 64 bits. The sequence number of the data frame corresponding to the most significant bit of the BA Bitmap subfield is stored in the SSN subfield. The data frames with the larger sequence numbers correspond to the bits which are less significant.

For example, the sequence number of the data frame corresponding to the bit located 3 bits right of the most significant bit is 3 plus the sequence number stored in the SSN subfield.

If the sequence number stored in the SSN subfield is 100, the BA Bitmap subfield stores acknowledgement information corresponding to data frames of sequence numbers 100 to 163.

Figure 10:
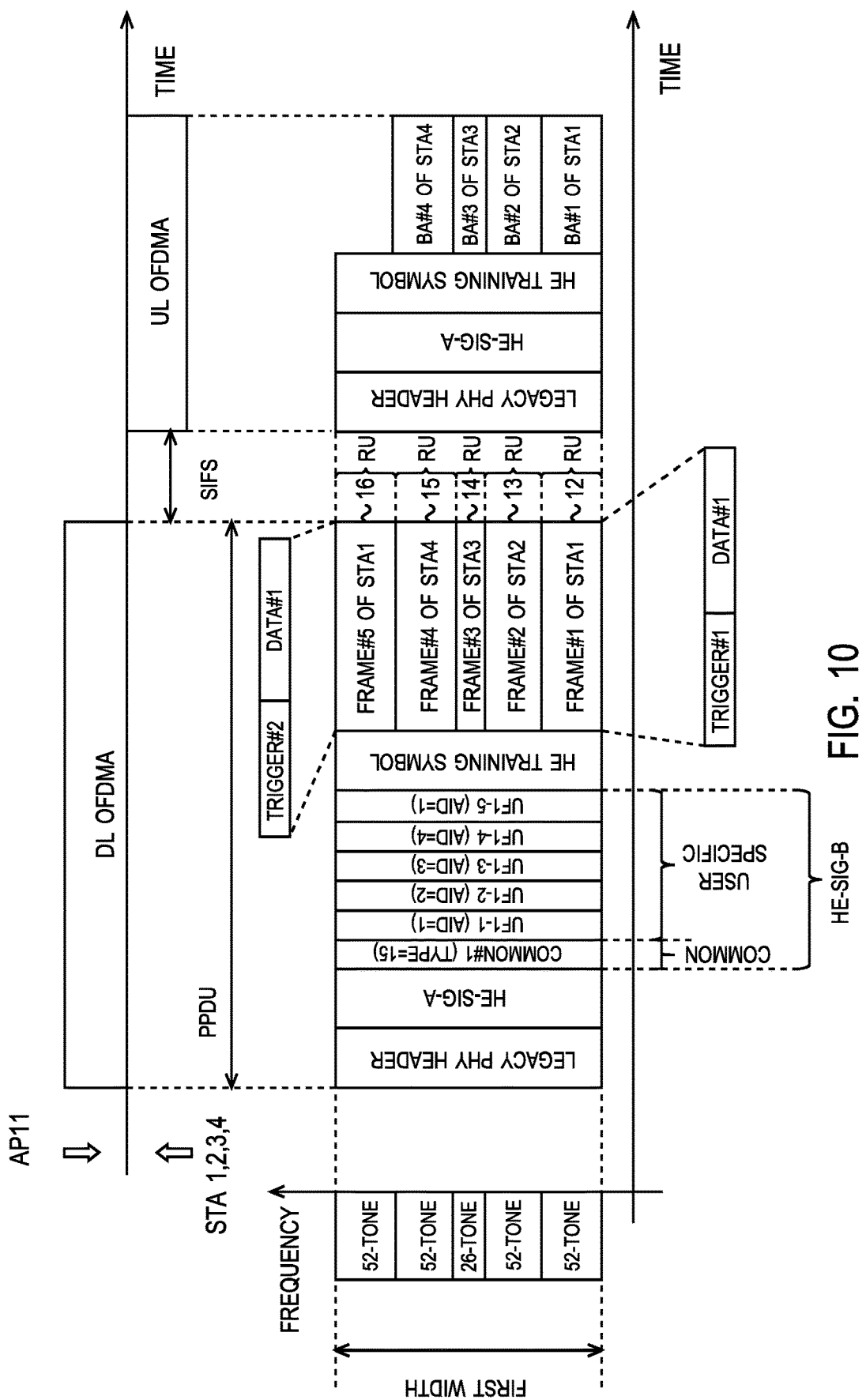
FIG. 10 is a diagram illustrating an example of frame sequence according to the first embodiment.

FIG. 10 is a diagram illustrating an example of frame sequence according to the first embodiment. One Association ID (AID) is assigned to each wireless terminal. In FIG. 10, the horizontal axis indicates the time and the vertical axis indicates the frequency.

First, the access point 11 transmits data to wireless terminals 1 to 4, concurrently by using DL OFDMA. Referring to the User Specific field of HE-SIG-B, it can be confirmed that the access point 11 is assigning AID=1, 2, 3 and 4 respectively to wireless terminals 1, 2, 3 and 4. Specifically, the same AID=1 is assigned to both UF1-1 and UF1-5. AID=2 is configured to UF1-2. AID=3 is configured to UF1-3. AID=4 is configured to UF1-4. Therefore, it is possible to assign the same AID to a plurality of User fields, setting the destination of a plurality of resource units (RUs) to the same wireless terminal.

Frames #1, #2, #3, #4 and #5 are transmitted by RU12, RU13, RU14, RU15 and RU16 of the DL OFDMA, respectively. The frames #1, #2, #3, #4 and #5 are physical payloads. Here, each of the frames include at least one Trigger frame and at least one data frame. Data used in upper layers such as the MAC layer can be stored in the data frame. The Trigger frame includes control data used when the wireless terminals 1 to 4 transmit data by UL OFDMA.

The sequence in FIG. 10 shows that frame #1 (RU12), frame #2 (RU13), frame #3 (RU14), frame #4 (RU15) and frame #5 (RU16) are transmitted by the access point 11. The frequency band becomes higher in the order of frame #1 (RU12), frame #2 (RU13), frame #3 (RU14), frame #4 (RU15) and frame #5 (RU16). The destination of frame #2 (RU13) is wireless terminal 2. The destination of frame #3 (RU14) is wireless terminal 3. The destination of frame #4 (RU15) is wireless terminal 4. The destination of frame #1 (RU12) and frame #5 (RU16) is wireless terminal 1. Both frame #1 and frame #5 include data frames with the same contents. Thereby, the same data is transmitted to the destination wireless communication device, improving the quality of data communication.

For example, if transmission of a data frame by either of the resource units fail due to factors including phasing, noise or interference, the same data content is transmitted by another data frame in a different resource unit. Thus, it is possible to improve the possibility that data is transmitted to the destination wireless communication device even when the condition of propagation path is poor. In the example of FIG. 10, two resource units were used to transmit data frames with the same contents. However, a greater number of resource units can be used to transmit data frames with the same data content. Also, for the data transmitted to other wireless terminals, data frames with the same data content can be transmitted by using a plurality of resource units (a combination of resource units).

The wireless communication device according to the embodiment (the access point) configures the destination for a plurality of resource units to a specific wireless terminal. Also, at least part of the data content transmitted by the plurality of resource units are same. In the example described above, the data frames transmitted by different resource units included the same data content. However, the contents of other types of frames could be the same.

If each of the wireless terminals successfully receives data from the access point 11, the wireless terminal transmits a BlockACK (BA) frame by UL OFDMA, after a period defined by SIFS has elapsed after the reception of DL OFDMA frame is completed. The BlockACK frame is an example of a response frame.

In the example of FIG. 10, at least frame #1, frame #2, frame 3 and frame #4 are successfully received by each wireless terminal.

Therefore, the wireless terminal 1 transmits BA #1 which is a BlockACK frame corresponding to frame #1 by using RU12. The wireless terminal 2 transmits BA #2 which is a BlockACK frame corresponding to frame #2 by using RU13. Similarly, the wireless terminal 3 transmits BA #3 which is a BlockACK frame corresponding to frame #3 by using RU14. The wireless terminal 4 transmits BA #4 which is a BlockACK frame corresponding to frame #4 by using RU15. As illustrated in FIG. 10, BlockACK frames (response frames) are transmitted by using the resource unit (RU) the corresponding frame has been transmitted.

One method for enabling the above usage of RUs is by setting data which requires the destination wireless terminal to respond by using the same resource unit (RU) as the transmitted data, even in cases the same contents is being transmitted by using a plurality of resource units. For example, the access point can use the Trigger frame (FIG. 7) to ensure that the destination wireless terminal uses the same resource unit when responses are being transmitted. Specifically, the access point can use the RU Position field in the STA Info field to specify the resource unit (RU) the destination wireless terminal uses for data communication.

The propagation paths of the physical frames transmitted from the access point to each wireless terminal and the propagation paths of the corresponding response frames transmitted by each wireless terminal are similar. Therefore, if the wireless terminal transmits a response frame to the access point 11 by using the same resource unit as the physical frame transmitted by the access point 11, the expected communication quality would also be similar. Thus, if the wireless terminal successfully receives the physical frame transmitted by the access point 11, the possibility that the access point 11 successfully receives the response frame transmitted from the wireless terminal would be high.

As mentioned above, frame #1 and frame #5 including data frames with the same data content are being transmitted to the wireless terminal 1. If the reception of both frame #1 and frame #5 are successful, the wireless terminal 1 can transmit the response frame corresponding to either of the frames. Also, the wireless terminal 1 can transmit the response frames for all the frames reception was successful. Details of the reception results and the transmission of response frames are described later.

Figure 11:
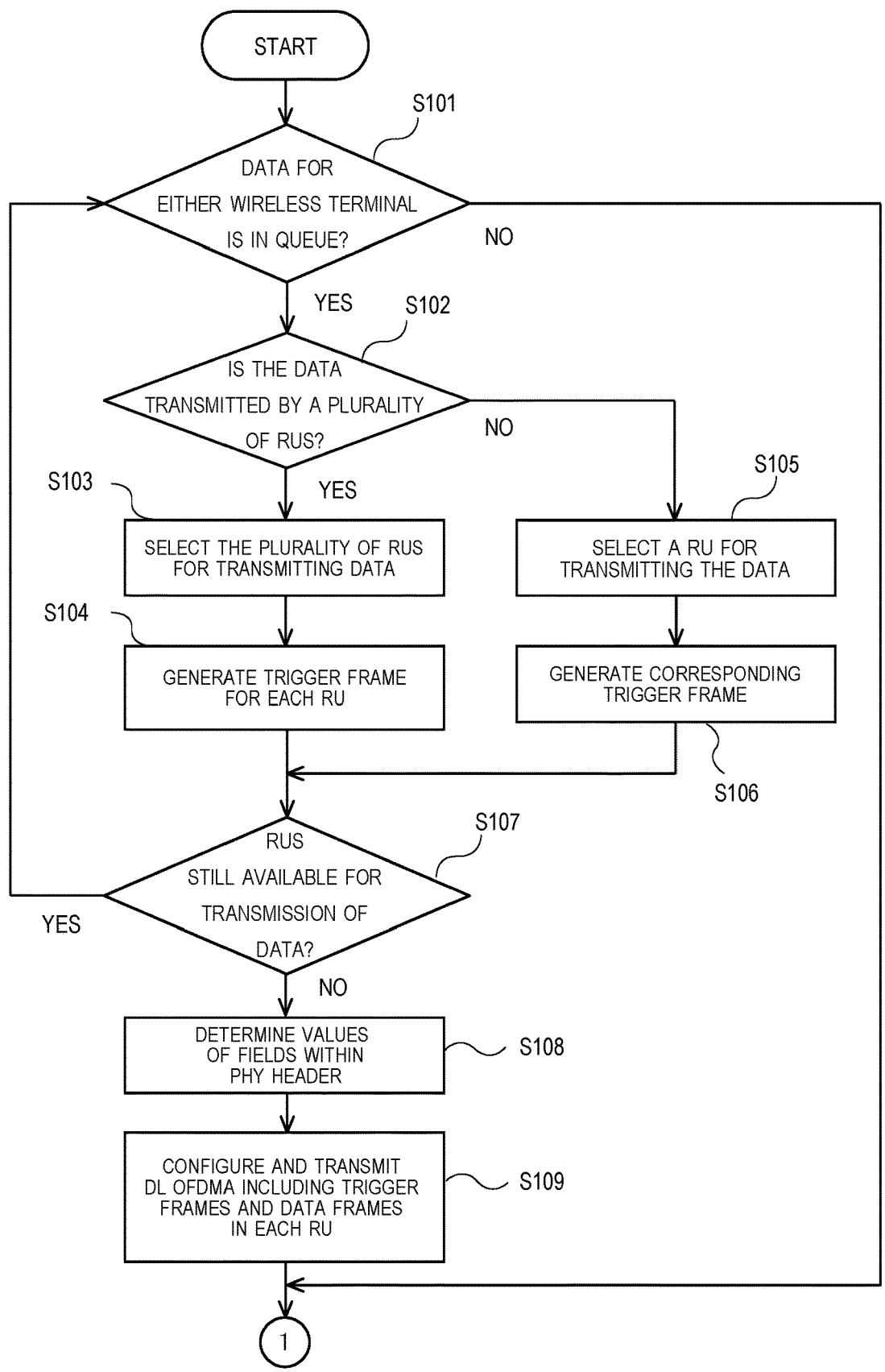
FIG. 11 is a flowchart explaining example of a process executed by the access point according to the first embodiment.
Figure 12:
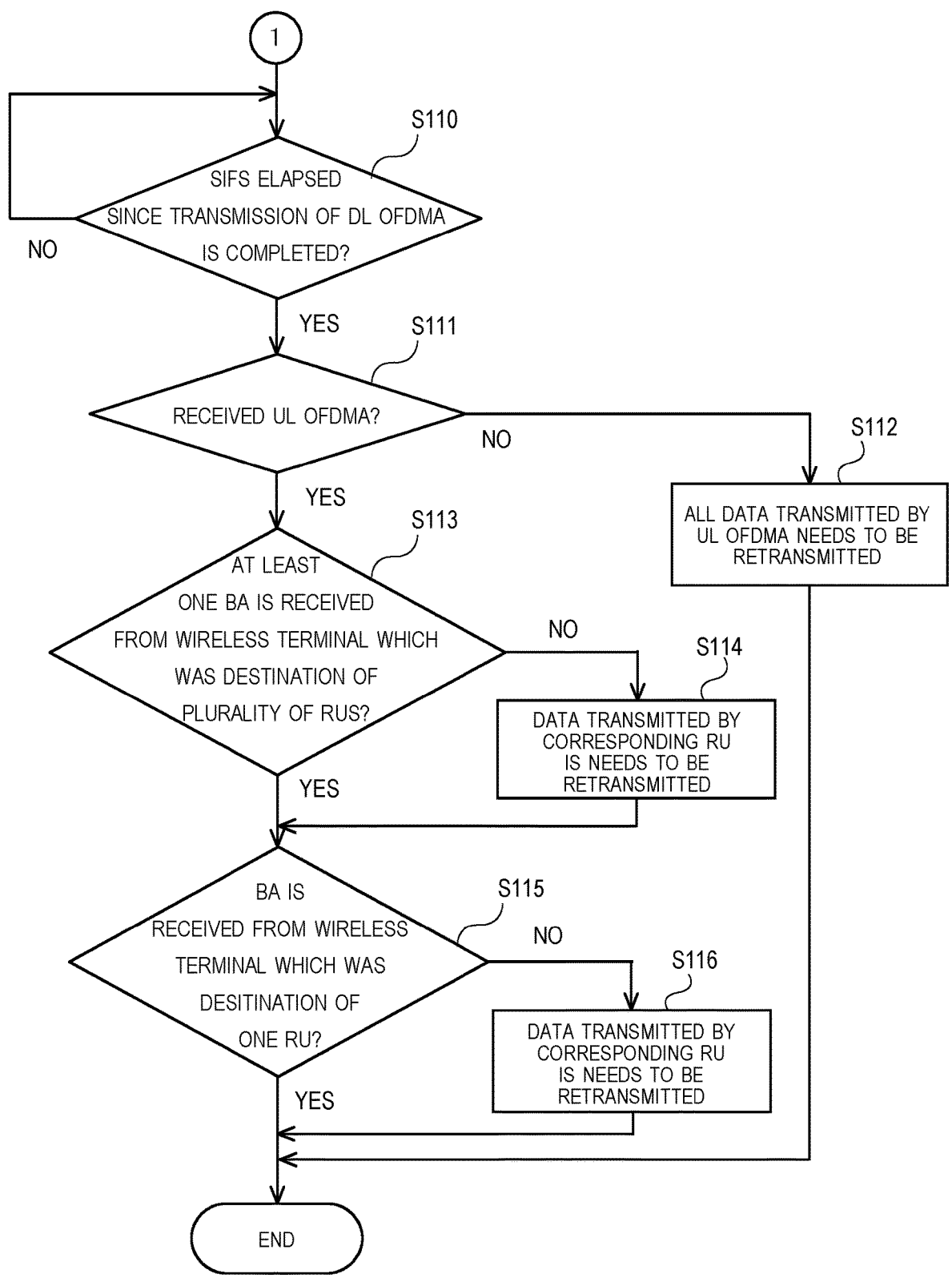
FIG. 12 is a flowchart explaining example of a process executed by the access point according to the first embodiment.

Next, the process executed by the wireless communication device according to the embodiment is described. FIG. 11 and FIG. 12 describe flowcharts explaining example of a process executed by the access point according to the first embodiment. In the following, the process is explained with reference to the flowcharts.

Before the process described in the flowchart of FIG. 11 and FIG. 12 are executed, the number of "widths" (bandwidths described in FIG. 8) used for transmission of data, the frequency band of "widths" and the RU allocation in each "width" are determined. The number of "widths" (bandwidths described in FIG. 8) used for transmission of data, the frequency band of "widths" and the RU allocation in each "width" can be determined by using any method. For example, the access point can determine the above settings. Also, the above settings can be determined based on the negotiation between the access point and the wireless terminals. In the following, the controller 115 is an example of a hardware circuit or a processing circuit of the wireless communication device.

First, the controller 115 of the access point confirms whether data which should be transmitted to either wireless communication device is in the transmission queue (step S101). If data which should be transmitted to either wireless communication device exists, the controller 115 dequeues the data in the head of the transmission queue.

Next, the controller 115 determines whether the data dequeued in the previous step (step S101) is transmitted by using a plurality of resource units (RUs) (step S102). Various criteria can be used to determine whether the data is transmitted by using a plurality of resource units. For example, by using the frame analyzing unit 114, the Traffic ID (TID) stored in the MAC header can be obtained. If the TID is a specific value, the controller 115 can determine to transmit the data (the MAC frame) by using a plurality of resource units.

Also, the controller can determine the data (MAC frame) needs to be transmitted by using a plurality of resource units if real-time transmission is required for the corresponding data. The access point can manage a table storing information indicating whether data needs to be transmitted to each wireless terminal belonging to the wireless LAN by using a plurality of resource units. If this table is used, the decision of step S102 is done based on the information stored in the table. The access point can generate the table by collecting information indicating whether data is transmitted by using a plurality of resource units, when the wireless terminals join the wireless LAN provided by the access point. This table can include information indicating the number of resource units used for transmission of data.

If the data needs to be transmitted by using a plurality of resource units (YES in step S102), the plurality of resource units used for transmission of data is selected (step S103). In the example of FIG. 10, the plurality of resource units is selected from resource units belonging to the "First Width" (a 20 MHz-wide bandwidth). In FIG. 10, data for wireless terminal 1 is transmitted by using a plurality of resource units.

The number of resource units selected in step S103 can be two, three or even more. In step S103, resource units which are not used for other wireless terminals can be selected. It is possible to select resource units from the lower frequency bands first. Also, it is possible to select resource units from the higher frequency bands first. It is possible to select resource units from random frequency bands. However, any method can be used to select the resource units. The number of subcarriers (tones) included in resource units used for the transmission of the same data can be either the same or different.

For higher success rates of data transmission by the selected resource units, resource units can be selected to ensure that the corresponding User fields (UFs) do not share the same CRC. In the example of FIG. 10, the user field which corresponds to RU12 which is used for transmitting data to the wireless terminal 1 is UF1-1. UF1-2 shares the same CRC with UF1-1. If the field including the CRC is called the second field, UF1-1 and UF1-2 share the second field. Therefore, if another resource unit needs to be selected for transmitting data to the wireless terminal 1, the selection of RU13 corresponding to UF1-2 could be avoided. In the example of FIG. 10, RU16 corresponding to UF1-5 which uses a different CRC is selected as the other resource unit for transmitting data to the wireless terminal 1. By executing the above process, it is possible to specify the destination for a plurality of resource units each corresponding to a first field (User field) which does not share a second field.

In the example above, the second field was a field which includes the CRC. However, the error detection code included in the second field is not limited to CRC. Thus, the type of error detection code can be different. Also, the second field may include an error correction code.

Next, a Trigger frame is generated for the selected resource unit (step S104). The generated Trigger frame includes control data used by the wireless terminals which transmit BlockACK frames by using UL OFDMA. In the example of FIG. 10, trigger frames (trigger #1 and trigger #2) which are transmitted to wireless terminal 1 are generated. Trigger #1 is the first Trigger frame. Trigger #2 is the second Trigger frame. Based on the table of FIG. 8, the value of the RU Position field is set to "37" in the first Trigger frame. Also, the value of the AID field is set to "1" in the first Trigger frame. Based on the table of FIG. 8, the value of the RU Position field is set to "40" in the second Trigger frame. The value of the AID field is also set to "1" in the second Trigger frame.

The Trigger frames generated in step S104 are configured to ensure that the wireless terminals receiving the data will transmit a BlockACK frame by using the same resource unit as the data. If the same data content are transmitted by the data frames but different resource units are used, Trigger frames need to be generated for each of the resource units.

If transmission of data by a plurality of resource units is not necessary (NO in step S102), one resource unit is selected for transmission of data (step S105). In the example of FIG. 10, either of the resource units within the "First Width" (20 MHz bandwidth) is selected. In the example of FIG. 10, data to wireless terminals 2 to 4 is transmitted by using one resource unit for each wireless terminal. In step S105, resource units which are not used for other wireless terminals can be selected. It is possible to select resource units from the lower frequency bands first. Also, it is possible to select resource units from the higher frequency bands first. It is possible to select resource units from random frequency bands. However, any method can be used to select the resource units. The number of subcarriers (tones) included in resource units used for the transmission of the same data can be either the same or different.

Next, a Trigger frame is generated for each of the selected resource units (step S106). The generated Trigger frame includes control data used by the wireless terminals which transmit BlockACK frames by using UL OFDMA. The Trigger frames generated in step S106 are configured to ensure that the wireless terminals receiving the data will transmit a BlockACK frame by using the same resource unit as the data. Based on the table of FIG. 8, the value of the RU Position field is set to "38" in the Trigger frame. Also, the value of the AID field is set to "2" in the Trigger frame.

If either the processes of step S104 or step S106 is executed, the controller 115 confirms whether resource units which can be used for transmission of data are still available (step S107). The number of available resource units depends on the number of frequency bandwidths ("Widths") and the RU allocation in each of the frequency bandwidths ("Widths").

If resource units which can be used for transmission of data are still available (YES in step S107), the process returns to step S101 to confirm whether there is data which should be transmitted to either of the wireless communication devices is in the transmission queue. If resource units which can be used for transmission of data are no longer available (NO in step S107), the controller 115 determines the contents and the values (physical parameters) in the physical header (step S108). Depending on necessity, the controller may transfer information of the physical parameters to the modulation circuit 122.

Examples of physical parameters in the physical header include: the MCS (Modulation and Scheme) of HE-SIG-B stored in HE-SIG-A; the TYPE indicating the RU allocation, stored in the Common field of HE-SIG-B; the value of the Association ID (AID) stored in the User field of HE-SIG-B; the value of MCS stored in the User field of HE-SIG-B; and the order of the User fields within the User Specific field.

In the example of FIG. 10, TYPE=15 is configured to the Common field as the RU allocation, based on the table of FIG. 2. In the example of FIG. 10, only the First Width is used. Therefore, there is only one Common field. The AIDs corresponding to each wireless terminal is stored in the User fields of HE-SIG-B. For example, the value "7" can be set as the MCS in the User field. Since it is possible to configure the value of MCS used for transmission of data in each resource unit in the User fields of HE-SIG-B, different values of MCS can be used for transmitting each resource unit.

Conditions which can be used to determine the value of MCS include the duration of the frame corresponding to the OFDMA. For example, it may be required that the time between the end of L-SIG and the end of HE-Data needs to be equal or less than 5.4 milliseconds. The value of MCS can be integers which are equal to or greater than 0. If the value of MCS is 0, the data transfer rate is 6.5 Mbps. If the value of MCS is 5, the data transfer rate is 52 Mbps. Generally, if the value of MCS becomes greater, the data transfer rate also becomes greater. However, if the value of MCS becomes greater, the possibility that the wireless terminal receives the HE-SIG-B successfully becomes lower.

If it is known that the communication quality is sufficiently high when a MCS of certain value is used, the MCS used for transmission of HE-SIG-B in the physical header and the MCS used for transmission of the resource unit in the physical payload can be set to the same value or close values. Different metrics can be used to measure the communication quality. One method for measuring the communication quality is by using the possibility that data can be received successfully. For example, the value of MCS used for transmission of HE-SIG-B and the value of MCS used for transmission of the resource unit can be set to "1". Also, the value of MCS used for transmission of HE-SIG-B can be set to "5", while the value of MCS used for transmission of the resource unit can be set to "7".

Next, the transmission frame generator 113 configures the DL OFDMA including the Trigger frames and the data frames transmitted by using each resource unit. Then, the controller 115 transmits the corresponding DL OFDMA (step S109). The configured DL OFDMA is transmitted from the antenna 125 in the transmission circuit 120. During transmission, the modulation circuit 122 modulates the signal corresponding to the DL OFDMA by using the specified physical parameters.

Then, the controller 115 confirms whether SIFS elapsed since transmission of the DL OFDMA is completed (step S110). If SIFS has not elapsed since the transmission of the DL OFDMA is completed (NO in step S110), the controller 115 checks the time again. If SIFS has elapsed since the transmission of the DL OFDMA is completed (YES in step S110), the controller 115 checks whether the UL OFDMA transmitted by the wireless terminal has been received (step S111).

If timeout has reached because the UL OFDMA transmitted by the wireless terminal cannot be received (NO in step 111), it is determined that all the data transmitted by the UL OFDMA in step S109 needs to be retransmitted (step S112). In this case, the controller 115 can add the data which needs to be retransmitted to the transmission queue. If the process of step S112 is completed, the process of the flowchart in FIG. 11 and FIG. 12 is finished. One example of the timeout period after SIFS is 40 microseconds. However, a different value can be used.

If the UL OFDMA transmitted by the wireless terminals 1 to 4 is detected (YES in step S111), the frame analyzing unit 114 confirms whether at least one BlockACK (BA) frame is received from the destination wireless terminal for the plurality of resource units (step S113). Specifically, if the value of the bit corresponding to the sequence number, in the BA Bitmap subfield of the BlockACK frame is set to "1", it could be confirmed that the wireless terminal received a data frame.

If a BlockACK (BA) frame from a wireless terminal that received data from a plurality of resource units cannot be received by UL OFDMA (NO in step S113), it is determined that the data transmitted by using the corresponding resource unit needs to be retransmitted (step S114). In this case, the controller 115 can add the corresponding data to the transmission queue. If the BlockACK frame is received but the bit corresponding to the sequence number in the BA bitmap subfield is set to "0", it means that the reception of data by the wireless terminal was not successful. Then, retransmission of data (as determined in step S114) is required.

If a BlockACK (BA) frame transmitted from a wireless terminal that received data from a plurality of resource units is received by UL OFDMA (YES in step S113) or the process of step S114 is executed, it is confirmed whether the BlockACK (BA) frame transmitted from the wireless terminal which received data from a single resource unit is received (step S115).

If a BlockACK frame cannot be received from the wireless terminal which received data transmitted by a single resource unit (NO in step S115), it is determined that the data transmitted by the corresponding resource unit needs to be retransmitted (step S116). In this case, the controller 115 can add the data which needs to be retransmitted to the transmission queue. Then, retransmission of data (as determined in step S116) is required.

If a BlockACK frame is received from the wireless terminal which received data transmitted by a single resource unit (YES in step S115), the process described in the flowcharts of FIG. 11 and FIG. 12 is finished.

(Configuration Example of the Wireless Terminal)

Figure 13:
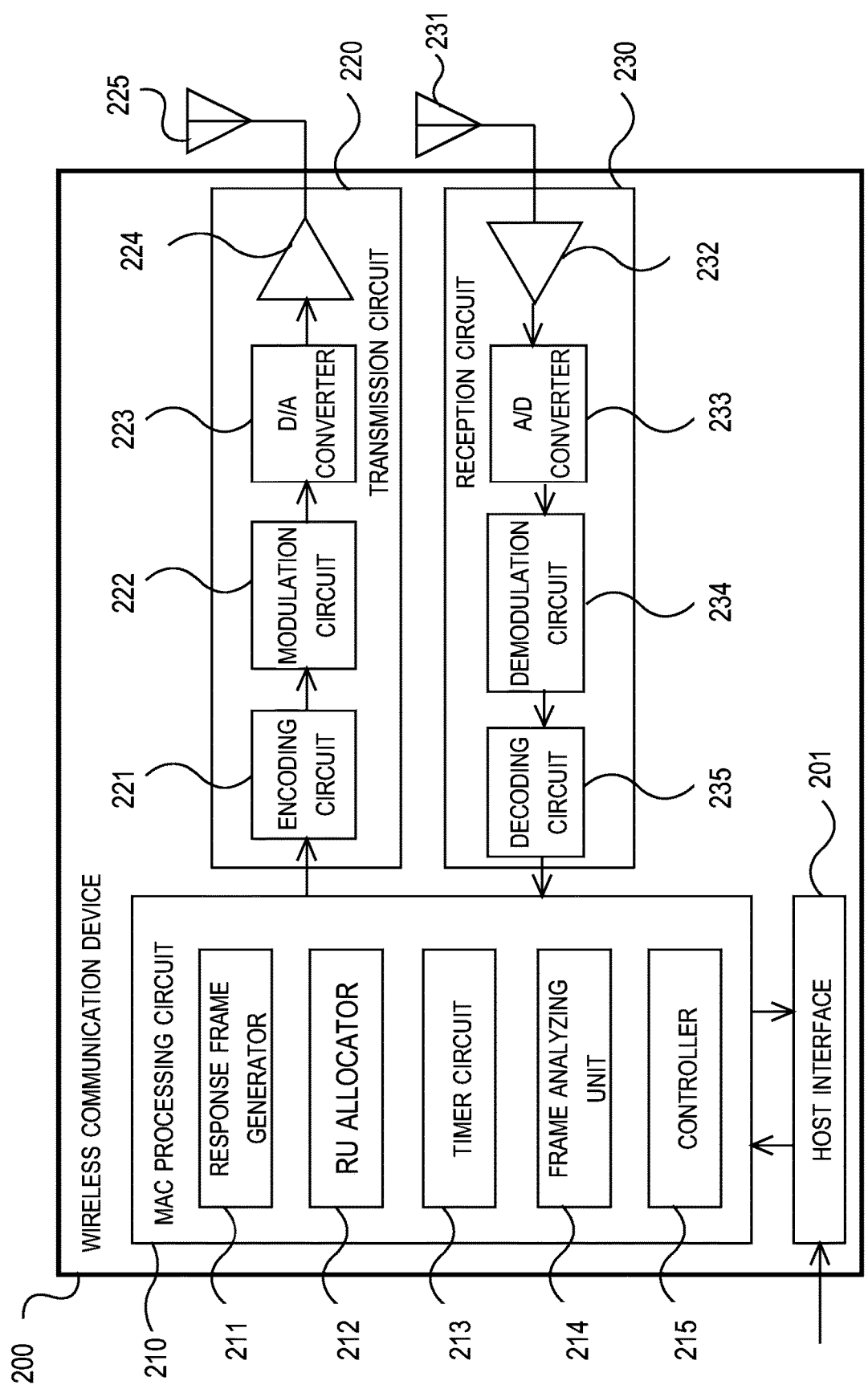
FIG. 13 is a block diagram presenting an example of a wireless terminal according to the first embodiment.

FIG. 13 is a block diagram presenting an example of a wireless terminal according to the first embodiment. In the following, the configuration of the wireless communication device according to the embodiment is described with reference to FIG. 13. FIG. 13 describes a configuration example of the wireless terminals 1 to 4.

The wireless communication device 200 in FIG. 13 executes data communication compliant to wireless LAN standards such as IEEE802.11 series or their successor standards. Examples of IEEE802.11 series standards include IEEE802.11a, IEEE802.11b, IEEE802.11g, IEEE802.11n, IEEE802.11ac and IEEE802.11ax. Wireless LAN is only one of the examples of communication standards the wireless communication device 200 uses. Thus, the wireless communication device 200 may use any other communication standard.

The wireless communication device 200 includes a host interface 201, a MAC processing circuit 210, a transmission circuit 220, and a reception circuit 230. The MAC processing circuit 210 includes a response frame generator 211, a RU allocator 212, a timer circuit 213, a frame analyzing unit 214 and a controller 215 as internal components. The transmission circuit 220 includes an encoding circuit 221, a modulation circuit 222, a D/A converter 223, a transmission amplifier 224 and an antenna 225 as internal components. The reception circuit 230 includes an antenna 231, a low-noise amplifier 232, an A/D converter 233, a demodulation circuit 234 and a decoding circuit 235 as internal components.

Here, the functions and configurations of the host interface 201, transmission circuit 220 and the reception circuit 230 are similar to the features and the configurations of the host interface 101, the transmission circuit 120 and reception circuit 130, respectively. The features and configurations of the RU allocator 212, the frame analyzing unit 214 and the controller 215 are similar to the features and configurations of the RU allocator 112, the frame analyzing unit 114 and the controller 115 of the wireless communication device 100. In the following, each component of the wireless communication device 200 is described, focusing mainly on the differences with the wireless communication device 100.

The response frame generator 211 generates a response frame (for example, a BlockACK frame) if a data frame with the own device (wireless communication device 200) configured as the destination is received successfully. The RU allocator 212 specifies the resource unit which is used for transmitting a response frame by using UL OFDMA. The timer circuit 213 executes measurement of time. By using the timer circuit 213, it is possible to keep the time between transmissions of frames equal to SIFS. For example, the response frame can be transmitted when SIFS elapsed after the reception of the corresponding MAC frame is completed.

The operation of the wireless communication device 200 (wireless terminal) is described below.

Suppose that the access point 11 transmitted a first physical frame. The first physical frame includes a first physical header and a first physical payload. The first physical header is transmitted by using a specific frequency band. The first physical payload is transmitted by using resource units generated by partitioning the specific frequency bandwidth. In this case, the wireless communication device 200 (the wireless terminal) receives the first physical frame. Then, the reception circuit 230 detects the first field included in the first physical header. This first field specifies the destination of either of the resource units. If the reception circuit 230 detects a plurality of first fields which specify the destination of resource units as the own device, either of the resource units corresponding to the plurality of first fields is modulated, extracting the first data. Then, the MAC processing circuit 210 determines the types of MAC frames included in the first data extracted by the reception circuit 230.

The transmission circuit 220 of the wireless communication device 200 transmits a second physical frame with a similar format as the first physical frame. The second physical frame includes a second physical header and a second physical payload. The second physical header is transmitted by using a specific frequency band. The second physical payload is transmitted by using resource units generated by partitioning the specific frequency band.

If the MAC processing circuit 210 determines that the type of MAC frame is a data frame, the MAC processing circuit 210 generates a response frame. The transmission circuit 220 uses either of the resource units the reception circuit 230 extracted the first data to transmit the second physical frame. The second physical frame includes a response frame as second data in the physical payload. The second physical frame is transmitted to the source device of the first physical frame, which is the access point 11.

Figure 14:
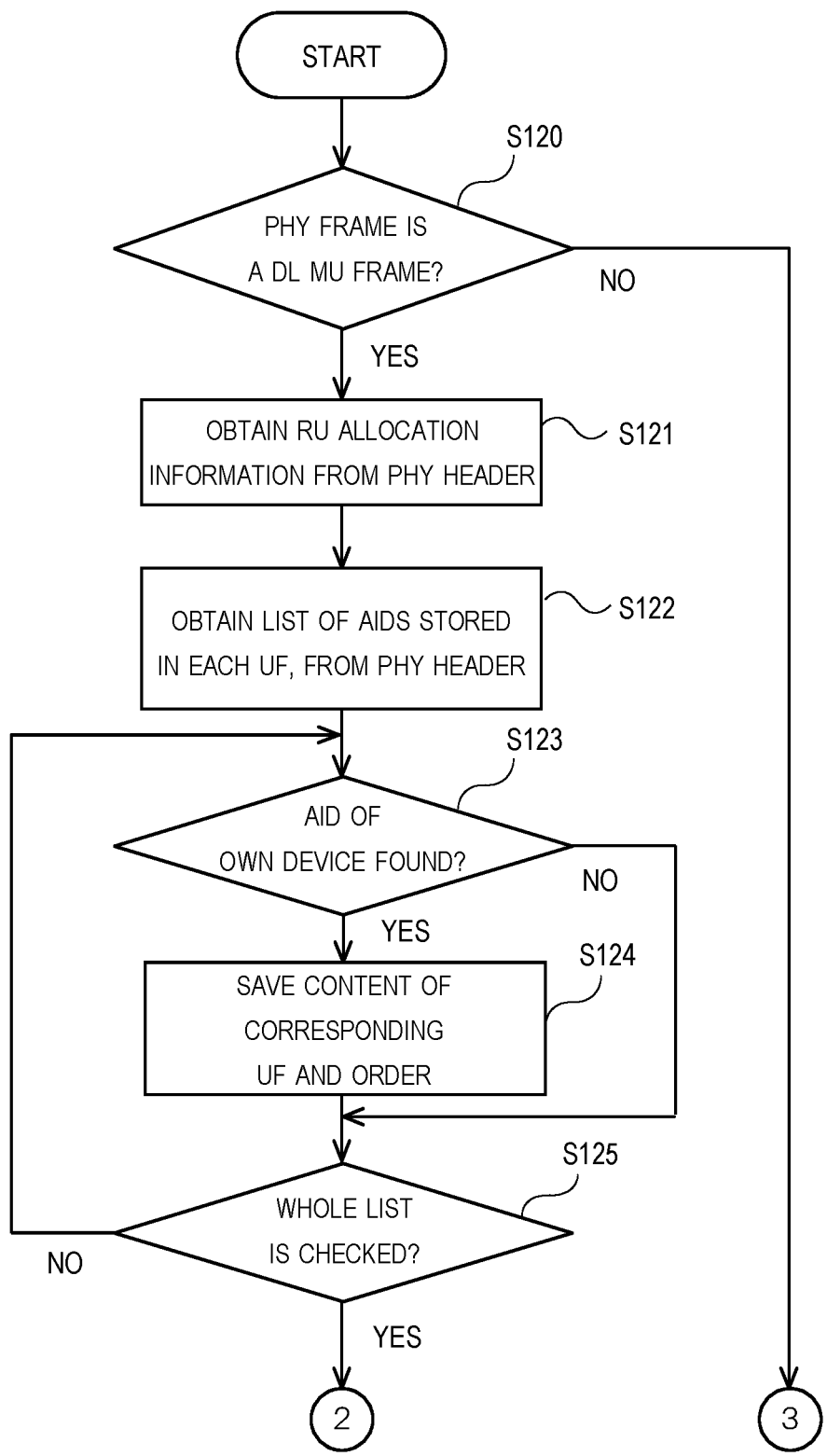
FIG. 14 is a flowchart explaining example of a process executed by the wireless terminal according to the first embodiment.
Figure 15:
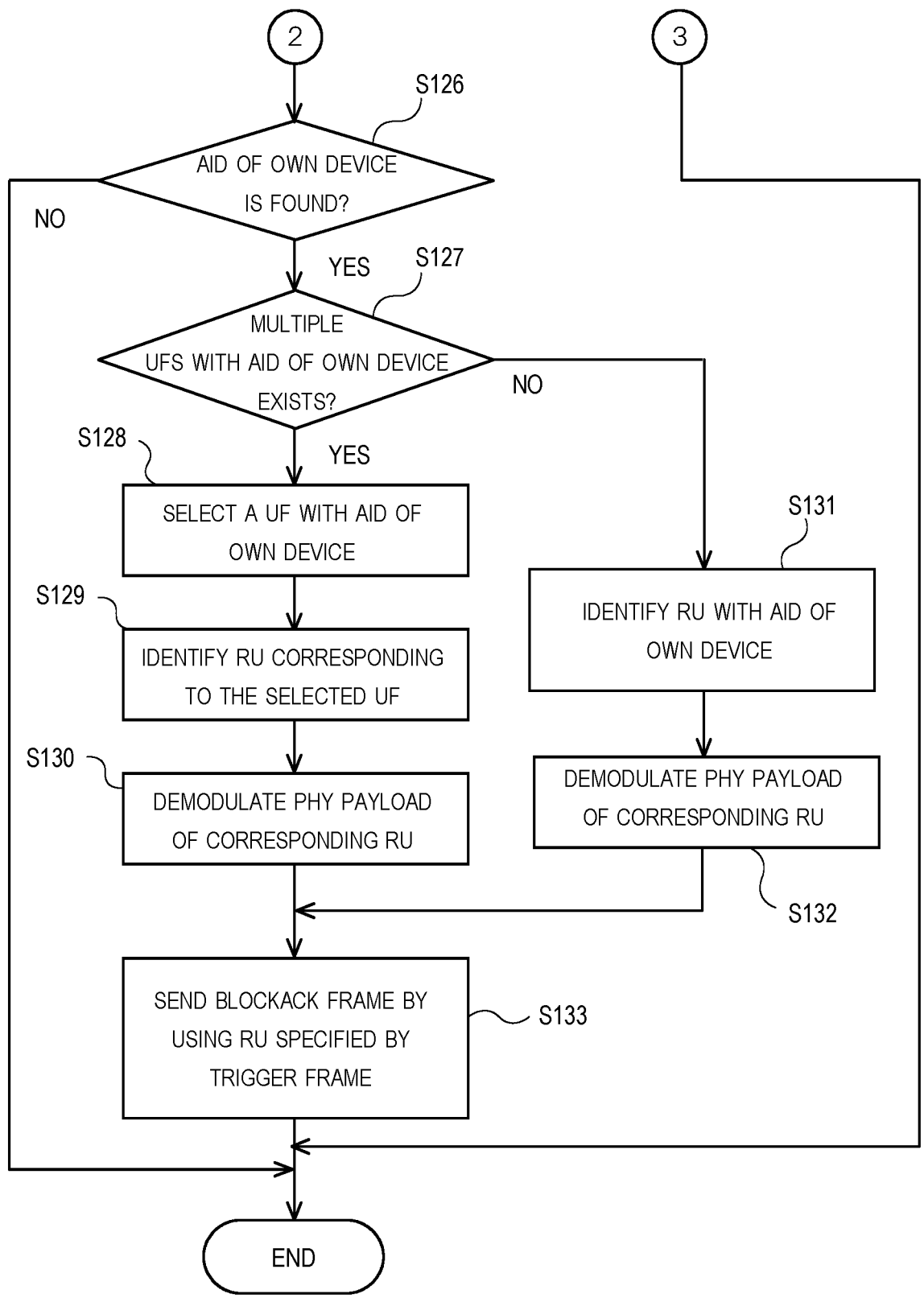
FIG. 15 is a flowchart explaining example of a process executed by the wireless terminal according to the first embodiment.

Next, the process executed by the wireless terminals 1 to 4 are described. FIG. 14 and FIG. 15 describe flowcharts of a process executed by the wireless terminal according to the first embodiment. The flowcharts describes the process executed by the wireless terminal when the wireless terminal receives a DL MU frame. In the following, the process is described in reference to FIG. 14 and FIG. 15.

First, the wireless terminal confirms whether the physical frame is a DL MU (Downlink Multi-User) frame (step S120). The controller 215 can refer to the L-SIG field and HE-SIG-A field in the physical header to confirm whether the received physical frame is a DL MU frame or not.

If the received physical frame is not a DL MU frame (NO in step S120), the process described in the flowcharts in FIG. 14 and FIG. 15 is finished.

If the received physical frame is a DL MU frame (YES in step S120), the RU allocation information is obtained from the physical header (step S121). Specifically, the controller 215 can obtain the RU allocation information by referring to the Common field in the HE-SIG-B of the physical header. Thereby, information on the bandwidth of the resource units and patterns of resource units in the physical payload can be obtained. The number of Common fields which need to be referred depends on the number of "Widths" (frequency bandwidths) which are used. Therefore, when a plurality of "Widths" is used in the physical frame, the Common fields corresponding to each of the "Widths" is referred. Then, the RU allocation information for each of the "Widths" can be obtained.

Next, a list of Association IDs (AIDs) is obtained by referring to each of the User fields (UF) in the physical header (step S122). By referring to HE-SIG-A, it is possible to obtain information on the length of HE-SIG-B. Then, it is possible to specify the end of the User Specific field. Then, the controller 215 refers to the list of AIDs to confirm whether the AID of the own device is included (step S123). If the AID of the own device is found (YES in step S123), the controller 215 saves both the contents of the User field with the corresponding AID and the chronological order of the User field in the User Specific field (step S124).

For example, for wireless terminal 1 (AID=1) in FIG. 10, the contents of UF1-1 and UF1-5, first order for UF1-1 and fifth order for UF1-5 is saved.

If the referred AID is not the AID of the own device (NO in step S123), if the process of step S124 is executed or if the AID cannot be obtained since errors were detected in the CRC, the controller 215 confirms whether the whole list of AIDs has been checked (step S125). If the whole list of AIDs has not been checked (NO in step S125), the next AID in the list is checked to confirm whether it matches with the AID of the own device (step S123). If the whole AID is referred (YES in step S125), the controller confirms whether the AID of the own device has been found in the list or not (step S126).

If the AID of the own device cannot be found in the list (NO in step S126), the process described in the flowcharts in FIG. 14 and FIG. 15 is finished. If the AID of the own device is found in the list (YES in step S126), the controller 215 confirms whether there is a plurality of User fields which include the AID of the own device (step S127).

If there is a plurality of User fields which include the AID of the own device (YES in step S127), either of the User fields including the AID of the own device is selected by the controller 215 (step S128). Then, the controller 215 identifies the resource unit (RU) corresponding to the User field which is selected in step S128 (step S129). The relation between the User field and the resource units is explained in the above description of FIG. 5. Then, the demodulation circuit 234 demodulates the physical payload of the subcarriers (frequency band) corresponding to the resource unit (step S130).

For example, for the wireless terminal 1 in FIG. 10, either UF1-1 or UF1-5 is selected. Then, either RU12 or RU16 in the physical payload is going to be demodulated.

If there is only a single User field which includes the AID of the own device (NO in step S127), the controller identifies the resource unit (RU) corresponding to the User field with the AID of the own device (step S131). The relation between the User field and the resource units is explained in the description of FIG. 5. Then, the demodulation circuit 234 demodulates the physical payload of the subcarriers (a part of a frequency band) corresponding to the resource unit (step S132).

For example, for the wireless terminal 2 in FIG. 10, UF1-2 is selected. Then, RU13 corresponding to UF1-2, in the physical payload is going to be demodulated.

If the process of either step S130 or step S132 is executed, the BlockACK frame is transmitted by using the resource unit (RU) specified in the Trigger frame (step S133). Specifically, the MAC frame is extracted from the physical payload demodulated by the reception circuit 230. Then, the corresponding MAC frame is transferred to the MAC processing circuit 210. The MAC processing circuit 210 separates the part corresponding to the data frame and the part corresponding to the Trigger frame. Then, control data used for transmission of the BlockACK frame (response frame) is extracted from the Trigger frame. Examples of the control data include the STA Info field and the Common Info field. Then, the process described in the flowcharts of FIG. 14 and FIG. 15 is finished.

In the example of FIG. 10, a plurality of resource units is used to transmit MAC frames with the same data content. When the wireless terminal 1 establishes an association with the wireless LAN provided by the access point 11, the access point 11 can notify to the wireless terminal 1 that the same data content is transmitted by using a plurality of resource units. Thereby, the wireless terminal can detect wireless signals which are transmitted by using a plurality of resource units, enabling the correct demodulation of physical header.

In the process described in FIG. 14 and FIG. 15, the wireless terminal demodulated either of the resource units in the plurality of resource units, if the destination assigned to the plurality of resource units was the own device. However, the wireless terminal can select the resource unit to modulate randomly from the above plurality of resource units. Also, the wireless terminal can select the resource unit based on the communication history of resource units. For example, the resource unit with the highest success rate of data reception can be selected. However, the wireless terminal can select the resource unit by using any method.

Also, if the wireless terminal receives a wireless signal including a plurality of resource units with the destinations assigned as the own device, the wireless terminal can skip the selection of resource units. Instead, the wireless terminal can demodulate all the resource units corresponding to the User fields with the AID of the own device. In this case, the wireless terminal can transmit response frames by using all the resource units corresponding to the User fields with the AID of the own device. Also, the wireless terminal may transmit response frames by using some of the resource units corresponding to the User fields with the AID of the own device.

In the process described in FIG. 14 and FIG. 15, all the User fields in the User Specific field were searched. However, not all the User fields in the User Specific field need to be searched. For example, if the wireless terminal detects a User field including the AID of the own device, the wireless terminal can stop searching for other User fields. Also, the wireless terminal can search all the User fields up to the end of the HE-SIG-B, while saving the data of only a single User field. In this case, the wireless terminal can overwrite the data of User field which is detected previously with the data of the User field which is detected later, if a plurality of User fields including the AID of the own device is detected. Also, the wireless terminal may retain the data of the User field which is detected previously while discarding the data of the User field which is detected later. Thereby, the amount of memory needed to store the data of the User fields can be reduced.

Second Embodiment

The access point according to the first embodiment executed wireless communication by using resource units (a set of subcarriers) within a single "Width" (a frequency bandwidth referred to as the "First Width"). However, the access point can execute wireless communication by using resource units of a wider frequency band. In the second embodiment, wireless communication by using resource units (RUs) in two "Widths" is described as an example.

The configuration of the wireless communication system according to the second embodiment (access point and wireless terminal) is similar to the first embodiment. In the following, communication process executed by the wireless communication system according to the second embodiment is described, mainly focusing on the difference with the first embodiment.

Figure 16:
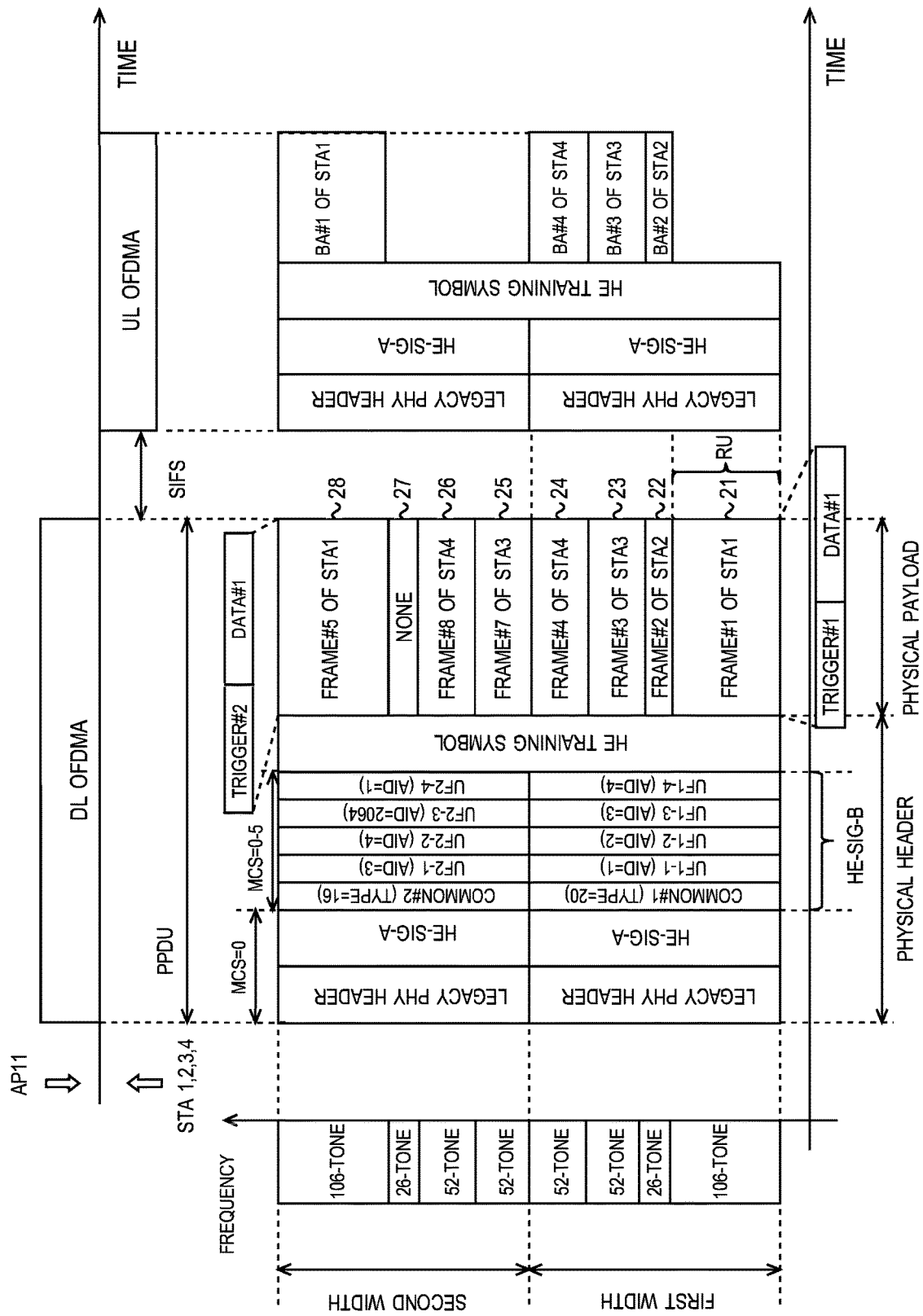
FIG. 16 is a diagram illustrating an example of frame sequence according to a second embodiment.

FIG. 16 is a diagram illustrating an example of frame sequence according to a second embodiment. In the second embodiment, both the "First Width" and the "Second Width" are used. Suppose that the frequency bandwidth of a single "Width" is 20 MHz. Therefore, in the sequence of FIG. 16, the access point transmits a DL OFDMA by using a frequency bandwidth of 40 MHz. In the second embodiment, a single Association ID (AID) is assigned to each wireless terminal.

In the sequence of FIG. 16, the horizontal axis indicates the time. The vertical axis indicates the frequency. In the sequence of FIG. 16, the access point 11 is transmitting a DL OFDMA to wireless terminals 1 to 4. In the sequence of FIG. 16, separate physical headers are being transmitted by using the "First Width" and the "Second Width". Thus, the transmission circuit of the wireless communication device can transmit physical frames by using a plurality of frequency bands. Also, the processing circuit (hardware circuit) of the wireless communication device can configure physical headers for each of the frequency bands used for transmitting the physical frames. In the "First Width" and the "Second Width", the Legacy PHY header and the HE-SIG-A with the same data content are transmitted.

However, HE-SIG-B fields with different data contents are transmitted in the "First Width" and the "Second Width". The HE-SIG-B field transmitted by the "First Width" includes information of the resource units included in the "First Width". The HE-SIG-B field transmitted by the "Second Width" includes information of the resource units included in the "Second Width".

The same frequency band is used for transmitting the HE-SIG-B field and the resource units. Therefore, if the wireless terminal receives the User field included in the HE-SIG-B field of either of the "Widths", the possibility that the MAC frame transmitted by the resource unit corresponding to the User field can be received successfully would be greater.

First, the access point 11 transmits data to wireless terminals 1 to 4 concurrently by using DL OFDMA. Referring to the User Specific field of HE-SIG-B field, the access point 11 is assigning AID=1, 2, 3 and 4 to wireless terminals 1, 2, 3 and 4 respectively.

Each of the resource units in the physical payload transmitted by the "First Width" include frame #1, frame #2, frame #3 and frame #4, respectively. Also, each of the resource units in the physical payload transmitted by the "Second Width" include frame #5, frame #7 and frame #8, respectively. Frame #1, frame #2, frame #3, frame #4, frame #5, frame #7 and frame #8 each include at least one trigger frame and one data frame. The data frame includes data for upper layers such as the MAC layer. The Trigger frame includes control data used by the wireless terminals 1 to 4, when data is transmitted by UL OFDMA.

The sequence in FIG. 16 shows that frame #1 (RU21), frame #2 (RU22), frame #3 (RU23), frame #4 (RU24), frame #7 (RU25), frame #8 (RU26) and frame #5 (RU28) are transmitted by the access point 11. The frequency band becomes higher in the order of frame #1 (RU21), frame #2 (RU22), frame #3 (RU23), frame #4 (RU24), frame #7 (RU25), frame #8 (RU26) and frame #5 (RU28). Between the frequency bands of frame #8 and frame #5, there is an unused RU27. The destination of frame #1 (RU21) and frame #5 is wireless terminal 1. The destination of frame #2 (RU22) is wireless terminal 2. The destination of frame #3 (RU23) and frame #7 (RU25) is wireless terminal 3. The destination of frame #4 (RU24) and frame #8 (RU26) is wireless terminal 4.

By using RU21 and RU28, the data frames with the same data content are transmitted to the wireless terminal 1. Similarly, by using RU23 and RU25, the data frames with the same data content are transmitted to the wireless terminal 3. By using RU24 and RU26, the data frames with the same data content are transmitted to the wireless terminal 4.

RU21, RU23 and RU24 are included in the First Width. RU28, RU25 and RU26 are included in the Second Width. Thus, in the second embodiment, resource units belonging to different "Widths" (frequency bandwidths) are used to transmit data frames with the same data content to the destination wireless communication device. Therefore, the plurality of resource units may include resource units from different frequency bands. The whole data content transmitted by the plurality of resource units (combination of resource units) do not need to be the same. For example, at least part of the data transmitted by the plurality of resource units (combination of resource units) may include the same data content.

By using the second embodiment, it becomes easier to select resource units which are more isolated in terms of frequency. Therefore, the quality of data communication can be improved. For example, if transmission of a data frame by either of the resource units fail due to factors including phasing, noise or interference, the same data content is transmitted by another data frame in a different resource located in an isolated frequency band. Thus, it is possible to improve the possibility that data is transmitted to the destination wireless communication device even when the condition of propagation path is poor.

In the example of FIG. 16, two resource units were used to transmit data frames with the same data content. However, a greater number of resource units can be used to transmit data frames with the same data content. Also, for the data transmitted to other wireless terminals, data frames with the same data content can be transmitted by using a plurality of resource units (a combination of resource units).

If each of the wireless terminals successfully receives data from the access point 11, the wireless terminal transmits a BlockACK (BA) frame by UL OFDMA, after a period defined by SIFS has elapsed after the reception of DL OFDMA frame is completed. The BlockACK frame is an example of a response frame.

In the example of FIG. 16, at least frame #5, frame #2, frame 3 and frame #4 are successfully received by each wireless terminal.

Therefore, the wireless terminal 1 transmits BA #1 which is a BlockACK frame corresponding to frame #5 by using RU28. The wireless terminal 2 transmits BA #2 which is a BlockACK frame corresponding to frame #2 by using RU22. Similarly, the wireless terminal 3 transmits BA #3 which is a BlockACK frame corresponding to frame #3 by using RU23. The wireless terminal 4 transmits BA #4 which is a BlockACK frame corresponding to frame #4 by using RU24. As illustrated in FIG. 16, BlockACK frames (response frames) are transmitted by using the resource unit (RU) the corresponding frame has been transmitted.

Figure 17:
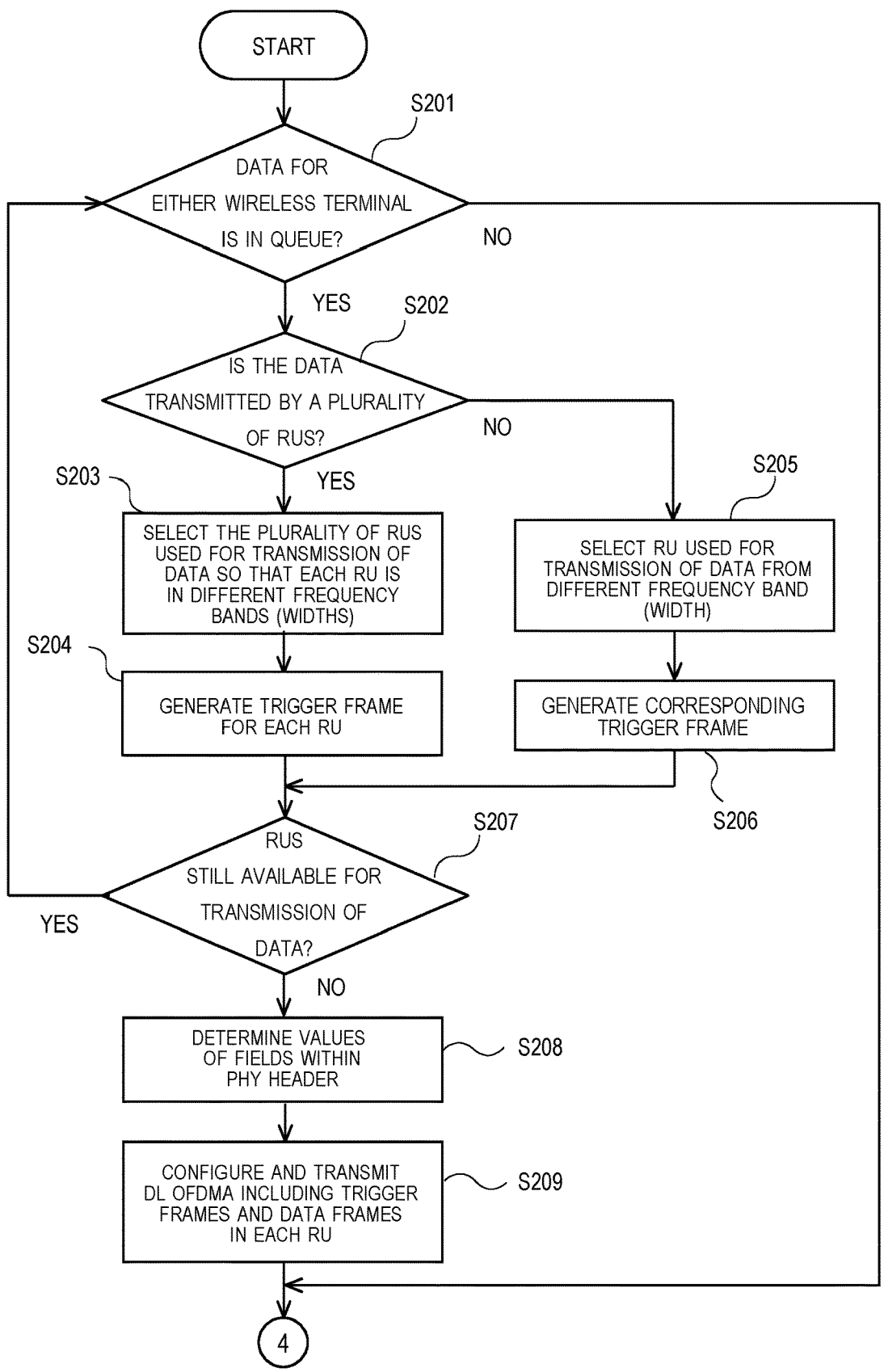
FIG. 17 is a flowchart explaining example of a process executed by the access point according to the second embodiment.
Figure 18:
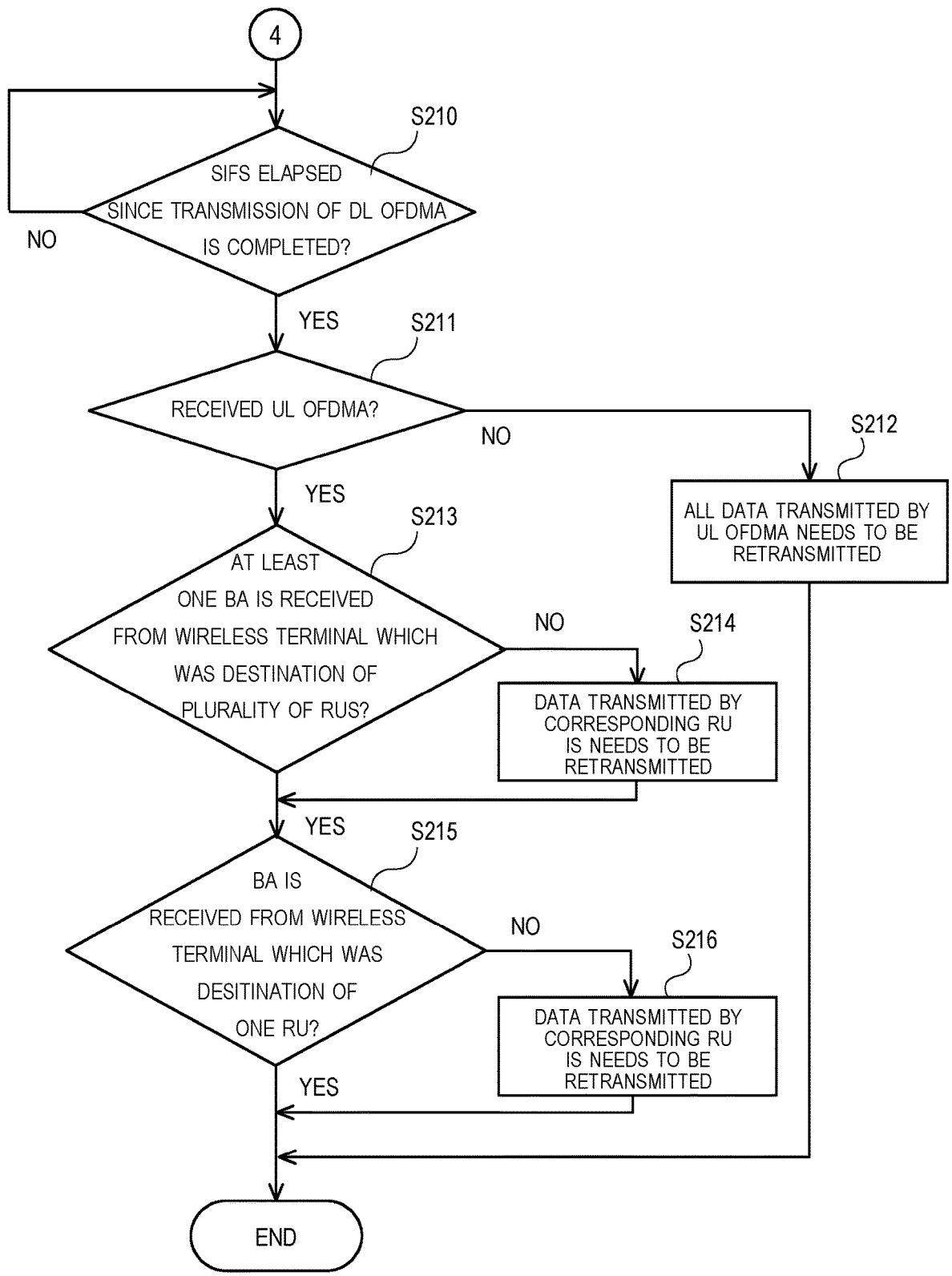
FIG. 18 is a flowchart explaining example of a process executed by the access point according to the second embodiment.

Next, the process executed by the access point according to the second embodiment is described. FIG. 17 and FIG. 18 describe flowcharts explaining example of a process executed by the access point according to the second embodiment. In the following, the process is explained with reference to the flowcharts.

Before the process described in the flowchart of FIG. 17 and FIG. 18 are executed, the number of "widths" (bandwidths described in FIG. 8) used for transmission of data, the frequency band and the RU allocation in each "width" are determined. The number of "widths" (bandwidths described in FIG. 8) used for transmission of data, the frequency band and the RU allocation in each "width" can be determined by using any method. For example, the access point can determine the above settings. Also, the above settings can be determined based on the negotiation between the access point and the wireless terminals.

First, the controller 115 of the access point confirms whether data which should be transmitted to either wireless communication device is in the transmission queue (step S201). If data which should be transmitted to either wireless communication device exists, the controller 115 dequeues the data in the head of the transmission queue.

Next, the controller 115 determines whether the data dequeued in the previous step (step S201) is transmitted by using a plurality of resource units (RUs) (step S202).

If the data needs to be transmitted by using a plurality of resource units (YES in step S202), the plurality of resource units used for transmission of data is selected ensuring that each resource unit belongs to different frequency bands ("Widths") (step S203). In the example of FIG. 16, data for wireless terminals 1,3 and 4 is transmitted by using a plurality of resource units. One resource unit is selected from the "First Width" and another resource unit is selected from the "Second Width". The number of selected resource units is not limited. Also the number of subcarriers (tones) included in resource units used for the transmission of the same data can be either the same or different.

Next, for the selected resource unit, the corresponding Trigger frame is generated (step S204). The generated Trigger frame includes control data used by the wireless terminals which transmit BlockACK frames by using UL OFDMA. In the example of FIG. 16, trigger frames (trigger #1 and trigger #2) which are transmitted to wireless terminal 1 are generated. Trigger #1 is the first Trigger frame. Trigger #2 is the second Trigger frame. Based on the table of FIG. 8, the value of the RU Position field is set to "53" in the first Trigger frame. Also, the value of the AID field is set to "1" in the first Trigger frame. Based on the table of FIG. 8, the value of the RU Position field is set to "56" in the second Trigger frame. The value of the AID field is also set to "1" in the second Trigger frame.

The Trigger frames generated in step S204 are configured to ensure that the wireless terminals receiving the data will transmit a BlockACK frame by using the same resource unit as the data.

If transmission of data by a plurality of resource units is not necessary (NO in step S202), a single resource unit is selected for transmission of data (step S205). In the example of FIG. 16, either of the resource units within the "First Width" or the "Second Width" (40 MHz bandwidth in total) is selected. In the example of FIG. 10, data to wireless terminals 2 is transmitted by using a single resource unit.

Next, a Trigger frame is generated for each selected resource unit (step S206). The generated Trigger frame includes control data used by the wireless terminals which transmit BlockACK frames by using UL OFDMA. The Trigger frames generated in step S206 are configured to ensure that the wireless terminals receiving the data will transmit a BlockACK frame by using the same resource unit as the data.

If either the processes of step S204 or step S206 is executed, the controller 115 confirms whether resource units which can be used for transmission of data are still available (step S207). The number of available resource units depend on the number of frequency bandwidths ("Widths") and the RU allocation in each of the frequency bandwidths ("Widths").

If resource units which can be used for transmission of data are still available (YES in step S207), the process returns to step S201 to confirm whether there is data which needs to be transmitted to either of the wireless communication devices is in the transmission queue. If resource units which can be used for transmission of data is no longer available (NO in step S207), the controller 115 determines the contents and the values (physical parameters) in the physical header (step S208). Examples of the physical parameters include HE-SIG-A and HE-SIG-B.

In the example of FIG. 16, TYPE=20 is configured to the Common field of the "First Width" as the RU allocation, based on the table of FIG. 2. TYPE=16 is configured to the Common field of the "Second Width" as the RU allocation, based on the table of FIG. 2. By using the User field of the "First Width", UF1-1 (AID=1), UF1-2 (AID=2), UF1-3 (AID=3) and UF1-4 (AID=4) are transmitted. By using the User field of the "Second Width", UF2-1 (AID=3), UF2-2 (AID=3), UF2-3 (AID=2046) and UF2-4 (AID=1) are transmitted. Here, the chronological order of the transmitted User Fields correspond to the order of the above descriptions.

The AID=2046 in UF2-3 indicates a RU which is not used. Thus, if AID=2046 is configured in the User field, the resource unit corresponding to the User field is not used for transmitting data.

Next, the transmission frame generator 113 configures the DL OFDMA including the Trigger frames and the data frames transmitted by using each resource unit. Then, the controller 115 transmits the corresponding DL OFDMA (step S209). The configured DL OFDMA is transmitted from the antenna 125 in the transmission circuit 120. During transmission, the modulation circuit 122 modulates the signal corresponding to the DL OFDMA by using the specified physical parameters.

Then, the controller 115 confirms whether SIFS elapsed since transmission of the DL OFDMA is completed (step S210). If SIFS has not elapsed since the transmission of the DL OFDMA is completed (NO in step S210), the controller 115 checks the time again. If SIFS has elapsed since the transmission of the DL OFDMA is completed (YES in step S210), the controller 115 checks whether the UL OFDMA transmitted by the wireless terminal has been received (step S211).

If timeout has reached because the UL OFDMA transmitted by the wireless terminal cannot be received (NO in step 211), it is determined that all the data transmitted by the UL OFDMA in step S209 needs to be retransmitted (step S212). In this case, the controller 115 can add the data which needs to be retransmitted to the transmission queue. If the process of step S212 is completed, the process of the flowchart in FIG. 17 and FIG. 18 is finished.

If the UL OFDMA transmitted by the wireless terminals 1 to 4 is detected (YES in step S211), the frame analyzing unit 114 confirms whether at least one BlockACK (BA) frame is received from the destination wireless terminal for the plurality of resource units (step S213).

If a BlockACK (BA) frame from a wireless terminal that received data from a plurality of resource units cannot be received by UL OFDMA (NO in step S213), it is determined that the data transmitted by using the corresponding resource unit needs to be retransmitted (step S214). In this case, the controller 115 can add the corresponding data to the transmission queue. If the BlockACK frame is received but the bit corresponding to the sequence number in the BA bitmap subfield is set to "0", it means that the reception of data by the wireless terminal was not successful. Then, retransmission of data (as determined in step S214) is required.

If at least one BlockACK (BA) frame transmitted from a wireless terminal that received data from a plurality of resource units is received by UL OFDMA (YES in step S213) or the process of step S214 is executed, it is confirmed whether the BlockACK (BA) frame transmitted from the wireless terminal which received data from one resource unit is received (step S215).

If a BlockACK frame cannot be received from the wireless terminal which received data transmitted by a single resource unit (NO in step S215), it is determined that the data transmitted by the corresponding resource unit needs to be retransmitted (step S216). In this case, the controller 115 can add the data which needs to be retransmitted to the transmission queue. Then, retransmission of data (as determined in step S116) is required. If the BlockACK frame is received but the bit corresponding to the sequence number in the BA bitmap subfield is set to "0", it means that the reception of data by the wireless terminal was not successful. Then, retransmission of data (as determined in step S216) is required.

If a BlockACK frame is received from the wireless terminal which received data transmitted by a single resource unit (YES in step S215), the process described in the flowcharts in FIG. 17 and FIG. 18 is finished.

Figure 19:
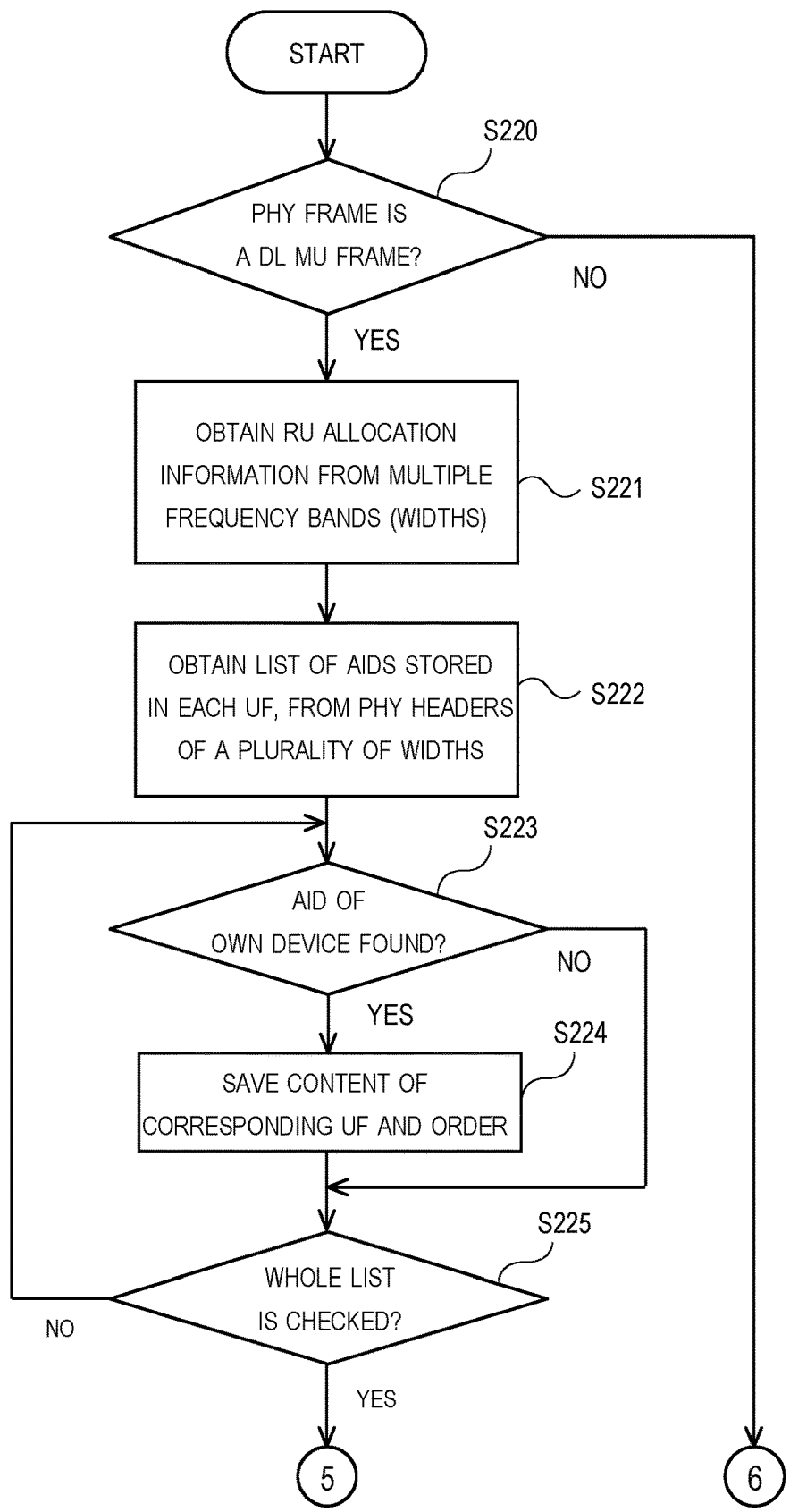
FIG. 19 is a flowchart explaining example of a process executed by the wireless terminal according to the second embodiment.
Figure 20:
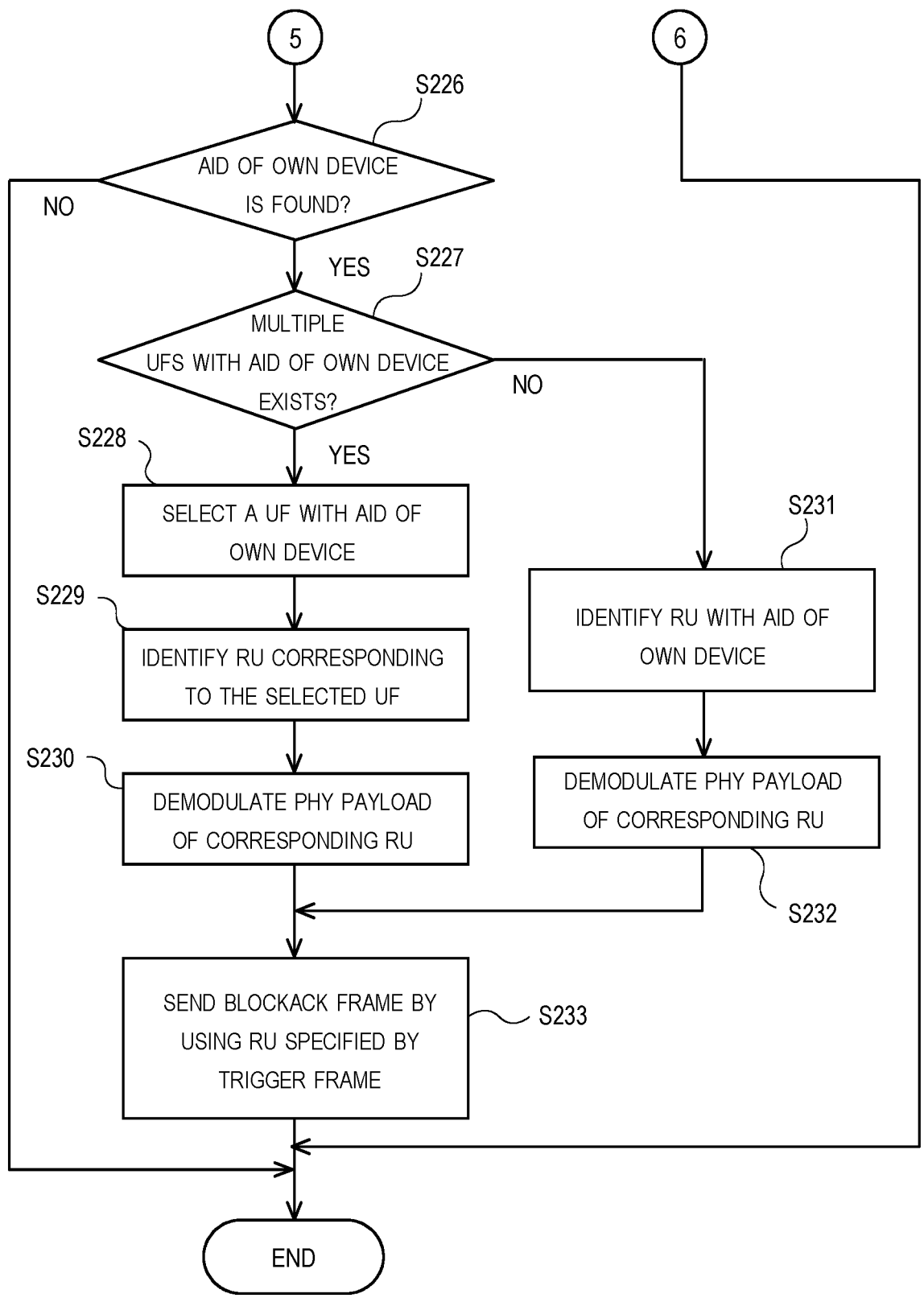
FIG. 20 is a flowchart explaining example of a process executed by the wireless terminal according to the second embodiment.

Next, the process executed by the wireless terminals according to the second embodiment is described. FIG. 19 and FIG. 20 describe flowcharts of a process executed by the wireless terminal according to the second embodiment. In the following, the process is described with reference to FIG. 19 and FIG. 20.

First, the wireless terminal confirms whether the physical frame is a DL MU (Downlink Multi-User) frame (step S220). In the example of FIG. 16, the controller 215 can refer to the L-SIG field and HE-SIG-A field in the physical header to confirm whether the received physical frame is a DL MU frame and the total frequency bandwidth is 40 MHz. Since the detected frequency bandwidth is 40 MHz, the controller 215 can infer that both the "First Width" and the "Second Width" include HE-SIG-B fields. If the received physical frame is not a DL MU frame (NO in step S220), the process described in the flowcharts of FIG. 19 and FIG. 20 is finished.

If the received physical frame is a DL MU frame (YES in step S220), the RU allocation information is obtained from the physical header (step S221). Specifically, the controller 215 can obtain the RU allocation information by referring to the Common field in the HE-SIG-B of the physical header for each of the "Widths". Thereby, information on the bandwidth of the resource units and patterns of resource units in the physical payload can be obtained. The number of Common fields which need to be referred depends on the number of "Widths" (frequency bandwidths) which are used. In the example of FIG. 16, the Common fields in the "First Width" and the "Second Width" are referred.

Next, a list of Association IDs (AIDs) is obtained by referring to each of the User fields (UF) in the physical header for the plurality of "Widths" (step S222). The controller 215 refers to the list of AIDs to confirm whether the AID of the own device is included (step S223). If the AID of the own device is found (YES in step S223), the controller 215 saves the contents of the User field with the corresponding AID and the order of the User field in the User Specific field (step S224).

If the referred AID is not the AID of the own device (NO in step S223), if the process of step S224 is executed or if the AID cannot be obtained since errors were detected in the CRC, the controller 215 confirms whether the whole list of AIDs has been checked (step S225). If the whole list of AIDs has not been checked (NO in step S225), the next AID in the list is checked to confirm whether it matches with the AID of the own device (step S223). If the whole AID is referred (YES in step S225), the controller confirms whether the AID of the own device has been found in the list or not (step S226).

If the AID of the own device cannot be found in the list (NO in step S226), the process described in the flowcharts of FIG. 19 and FIG. 20 is finished. If the AID of the own device is found in the list (YES in step S226), the controller 215 confirms whether there is a plurality of User fields which include the AID of the own device (step S227).

If there is a plurality of User fields which include the AID of the own device (YES in step S227), either of the User fields including the AID of the own device is selected by the controller 215 (step S228). Then, the controller 215 identifies the resource unit (RU) corresponding to the User field which is selected in step S228 (step S229). The relation between the User field and the resource units is explained in the aforementioned description of FIG. 5. Then, the demodulation circuit 234 demodulates the physical payload of the subcarriers (frequency band) corresponding to the resource unit (step S230).

If there is only a single User field which includes the AID of the own device (NO in step S227), the controller identifies the resource unit (RU) corresponding to the User field with the AID of the own device (step S231). The relation between the User field and the resource units is explained in the aforementioned description of FIG. 5. Then, the demodulation circuit 234 demodulates the physical payload of the subcarriers (frequency band) corresponding to the resource unit (step S232).

If the process of either step S230 or step S232 is executed, the BlockACK frame is transmitted by using the resource unit (RU) specified in the Trigger frame (step S233). Specifically, the MAC frame is extracted from the physical payload demodulated by the reception circuit 230. Then, the corresponding MAC frame is transferred to the MAC processing circuit 210. The MAC processing circuit 210 separates the part corresponding to the data frame and the part corresponding to the Trigger frame. Then, control data used for transmission of the BlockACK frame (response frame) is extracted from the Trigger frame. Examples of the control data include the STA Info field and the Common Info field. Then, the process described in the flowcharts of FIG. 19 and FIG. 20 is finished.

Third Embodiment

The wireless communication system according to the second embodiment used two "Widths" (the "First Width" and the "Second Width"). However, the number of "Widths" (frequency bands) used for data communication can be greater than the examples described above. In the wireless communication system according to the third embodiment, more "Widths" (frequency bands) are used during data communication.

The configuration of the wireless communication system according to the third embodiment (access point and wireless terminal) is similar to the first embodiment. In the following, the data communication process executed by the wireless communication system according to the third embodiment is described, mainly focusing on the difference with the first embodiment.

Figure 21:
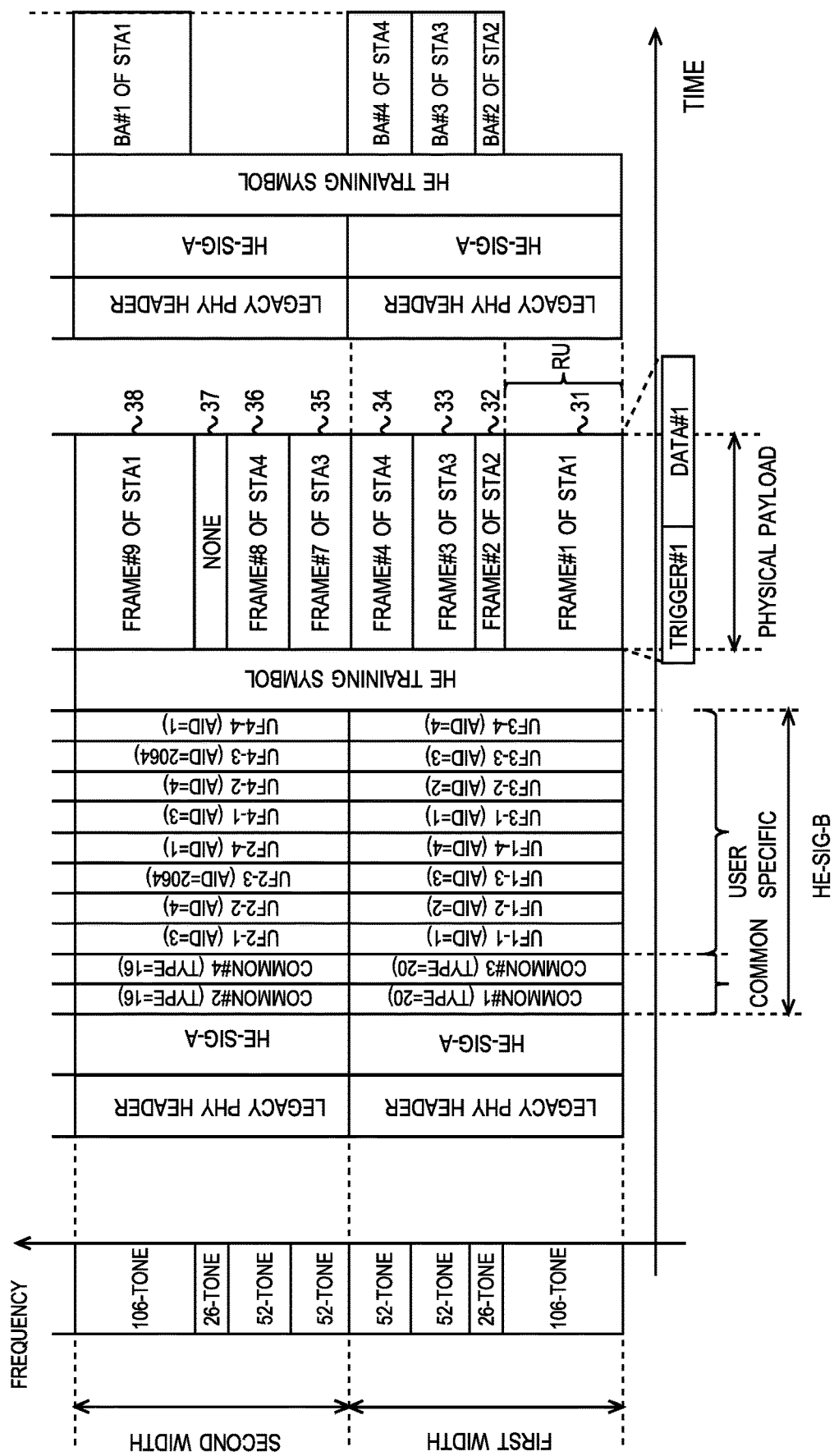
FIG. 21 is a diagram illustrating an example of frame sequence according to a third embodiment.
Figure 22:
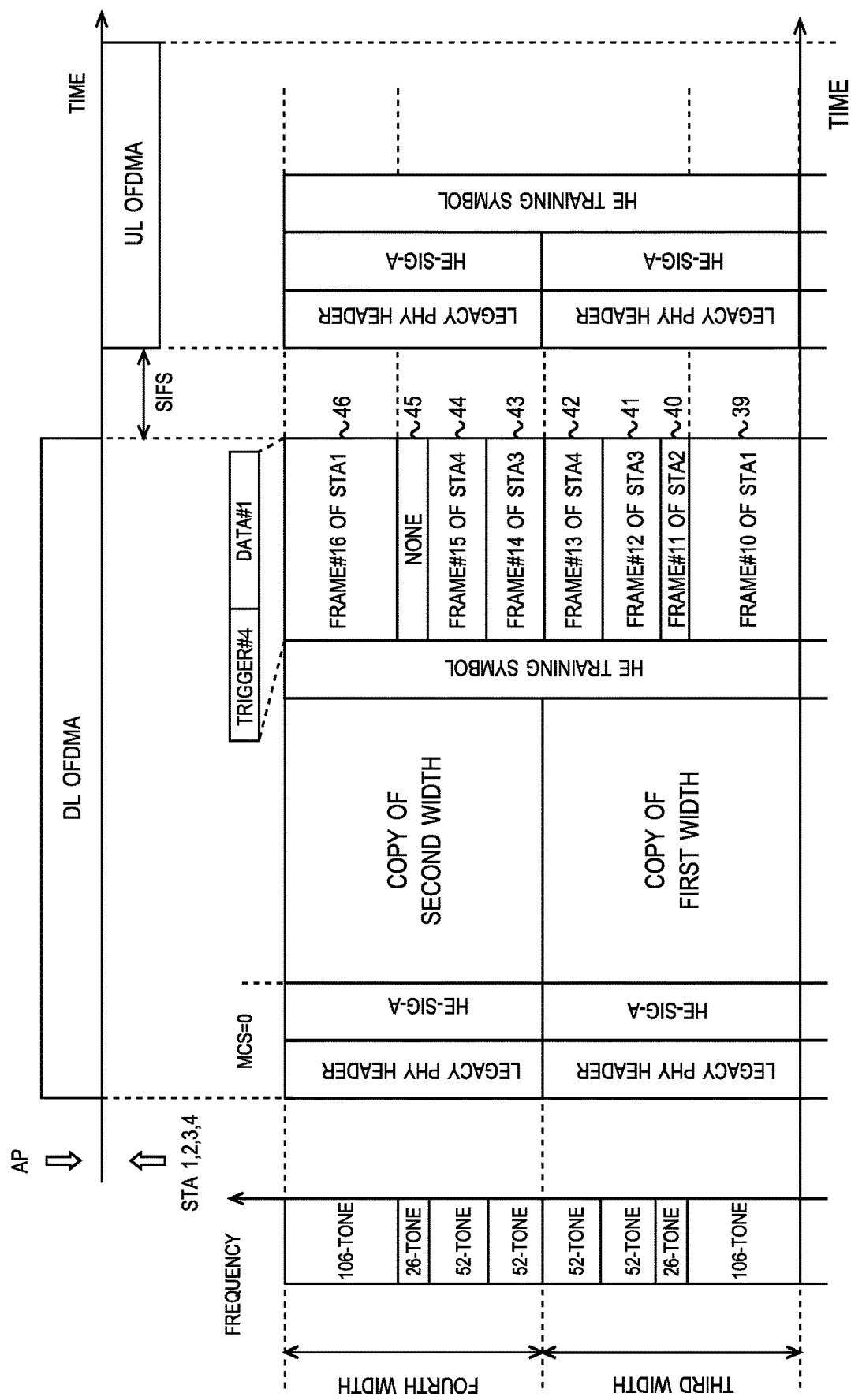
FIG. 22 is a diagram illustrating an example of frame sequence according to the third embodiment.

FIG. 21 and FIG. 22 are diagrams illustrating an example of frame sequence according to a third embodiment. As shown in FIG. 21 and FIG. 22, the wireless communication system according to the third embodiment uses four frequency bandwidths including the "First Width", the "Second Width", the "Third Width" and the "Fourth Width". Since the width of each "Width" is 20 MHz, a total of 80 MHz is used for data communication. The number of AIDs the access point is assigning to each wireless terminal is one.

The access point 11 is configuring a physical header and a physical payload for each of the "First Width", the "Second Width", the "Third Width" and the "Fourth Width". Different configuration data is stored in the HE-SIG-B of the physical headers of the "First Width" and the "Second Width".

In the example of FIG. 21 and FIG. 21, the HE-SIG-B in the physical header of the "Third Width" is a copy of the HE-SIG-B in the physical header of the "First Width". The HE-SIG-B in the physical header of the "Fourth Width" is a copy of the HE-SIG-B in the physical header of the "Second Width".

If the wireless terminals only refer to the HE-SIG-B in the "First Width" and the "Second Width", the HE-SIG-B in the "Third Width" and the "Fourth Width" is not referred in the processes. Therefore, it is possible to store the HE-SIG-B from a different "Width" as dummy data. However, if the wireless terminal refers to the HE-SIG-B in the "Third Width" and the "Fourth Width", effective data could be stored.

In the following description, the HE-SIG-B in the "Third Width" and the "Fourth Width" is treated as dummy data in the wireless terminals. Therefore, the configuration data for the data being transmitted by the "Third Width" and the "Fourth Width" is stored in HE-SIG-B of the "First Width" and the "Second Width".

The HE-SIG-B of the "First Width" includes common #1 and common #3. Common #1 and common #3 are Common fields. The common #1 stores the RU allocation in the "First Width". The common #3 stores the RU allocation in the "Third Width". TYPE=20 is configured in both common #1 and common #3. Therefore, the RU allocation in the "First Width" and the "Third Width" take the same pattern (TYPE=20 in FIG. 2).

The HE-SIG-B of the "Second Width" includes common #2 and common #4. Common #2 and common #4 are Common fields. The common #2 stores the RU allocation in the "Second Width". The common #4 stores the RU allocation in the "Fourth Width". TYPE=16 is configured in both common #2 and common #4. Therefore, the RU allocation in the "Second Width" and the "Fourth Width" take the same pattern (TYPE=16 in FIG. 2).

The User Specific field of the "First Width" includes both the information of the resource units transmitted in the "First Width" and the information of the resource units transmitted in the "Third Width". UF1-1 (AID=1), UF1-2 (AID=2), UF1-3 (AID=3) and UF1-4 (AID=4) each correspond to RU31, RU32, RU33 and RU34, respectively. RU31, RU32, RU33 and RU34 are transmitted in the "First Width". The destination of RU31 is the wireless terminal 1. The destination of RU32 is the wireless terminal 2. The destination of RU33 is the wireless terminal 3. The destination of RU34 is the wireless terminal 4.

UF3-1 (AID=1), UF3-2 (AID=2), UF3-3 (AID=3) and UF3-4 (AID=4) each correspond to RU39, RU40, RU41 and RU42, respectively. RU39, RU40, RU41 and RU42 are transmitted in the "Third Width". The destination of RU39 is the wireless terminal 1. The destination of RU40 is the wireless terminal 2. The destination of RU41 is the wireless terminal 3. The destination of RU42 is the wireless terminal 4.

The User Specific field of the "Second Width" includes both the information of the resource units transmitted in the "Second Width" and the information of the resource units transmitted in the "Fourth Width". UF2-1 (AID=3), UF2-2 (AID=4), UF2-3 (AID=2064) and UF2-4 (AID=1) each correspond to RU35, RU36, RU37 and RU38 in the "Second Width", respectively. The destination of RU35 is the wireless terminal 3. The destination of RU36 is the wireless terminal 4. RU37 is not used for communication of data. The destination of RU38 is the wireless terminal 1.

UF4-1 (AID=3), UF4-2 (AID=4), UF4-3 (AID=2064) and UF4-4 (AID=1) each correspond to RU39, RU44, RU45 and RU46 in the "Fourth Width", respectively. The destination of RU39 is the wireless terminal 3. The destination of RU44 is the wireless terminal 4. RU45 is not used for communication of data. The destination of RU46 is the wireless terminal 1.

Therefore, the processing circuit (hardware circuit) of the wireless communication device according to the embodiment can configure a plurality of first fields (User fields) in the physical header. Each of the first fields (User fields) include the destination of either of the resource units (RUs) in a plurality of frequency bandwidths ("Widths") the physical headers are being transmitted.

By executing the process described in the example of FIG. 21 and FIG. 22, the same data content (MAC frame) can be transmitted by using RUs 31, 38, 39 and 46, all having the wireless terminal 1 as the destination device. Similarly, the same data content (MAC frame) can be transmitted by using RUs 33 and 41, both having the wireless terminal 2 as the destination device. The same data content (MAC frame) can be transmitted by using RUs 33, 35 and 41, all having the wireless terminal 3 as the destination device. The same data content (MAC frame) can be transmitted by using RUs 34, 36, 42 and 44, all having the wireless terminal 4 as the destination device. As shown in the example of FIG. 21 and FIG. 22, a different number of resource units can be used for transmitting data to each of the wireless terminals. The number of resource units used for transmitted data to each wireless terminal is not limited.

The resource units used for transmission of data to each of the wireless terminals are located in different "Widths" (frequency bands). Therefore, if transmission of a data frame by either of the resource units fail due to factors including phasing, noise or interference, the same data content is transmitted by another data frame in a different resource unit located in an isolated frequency band. Thus, it is possible to improve the possibility that data is transmitted to the destination wireless communication device even when the condition of propagation path is poor in a certain frequency band. The resource units used for transmission of data to each wireless terminal do not need to be located in the same "Width" (frequency band).

If the wireless terminal can successfully receive the User fields included in the HE-SIG-B of the "First Width" and the "Second Width", the possibility that the wireless terminal can receive MAC frames transmitted by using the same resource unit as the corresponding User field would be greater. If the wireless terminal treats the HE-SIG-B in the "Third Width" and the "Fourth Width" as dummy data, the communication quality needs to be estimated by using fields other than the User field.

Figure 23:
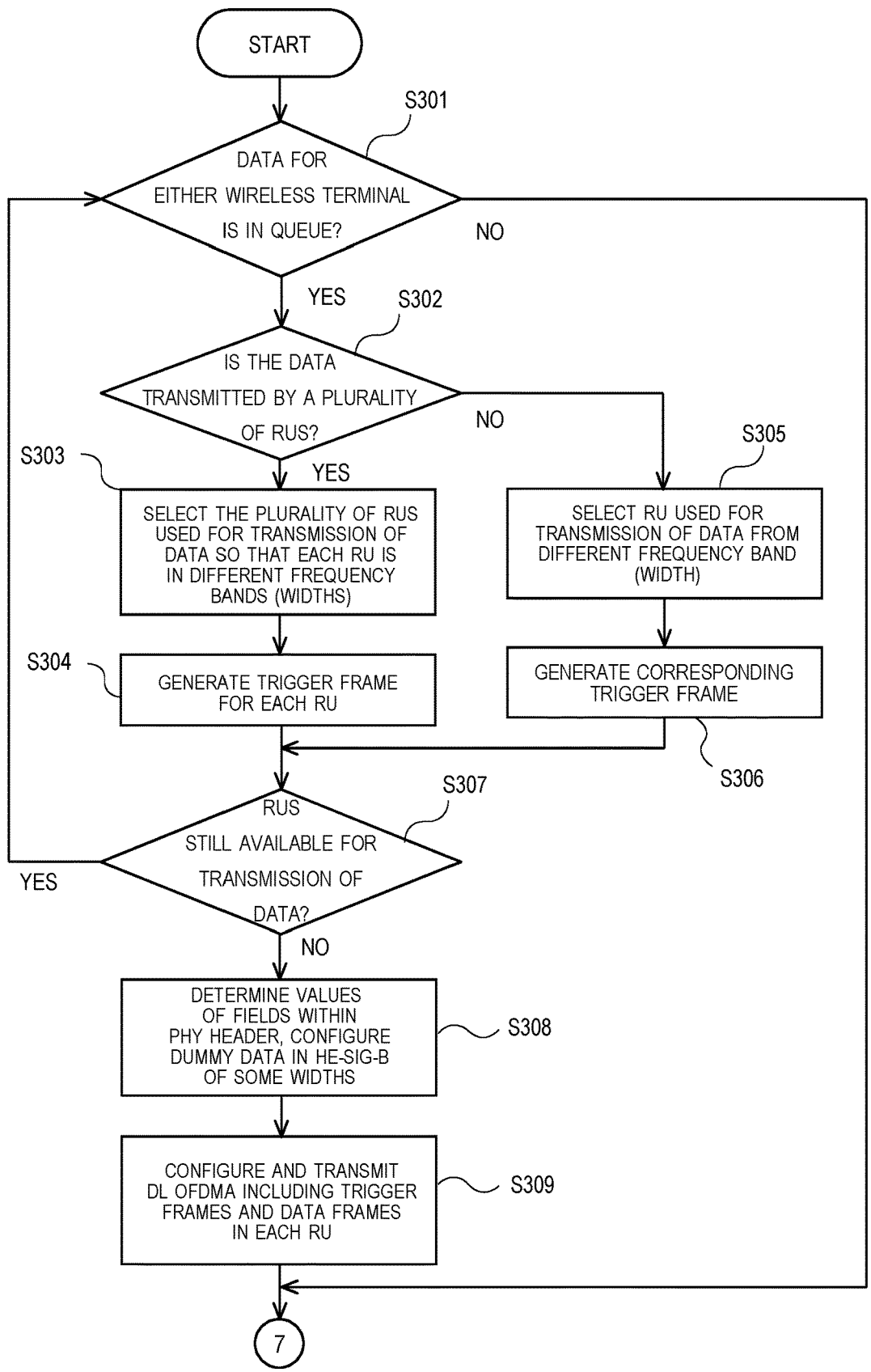
FIG. 23 is a flowchart explaining example of a process executed by the access point according to the third embodiment.
Figure 24:
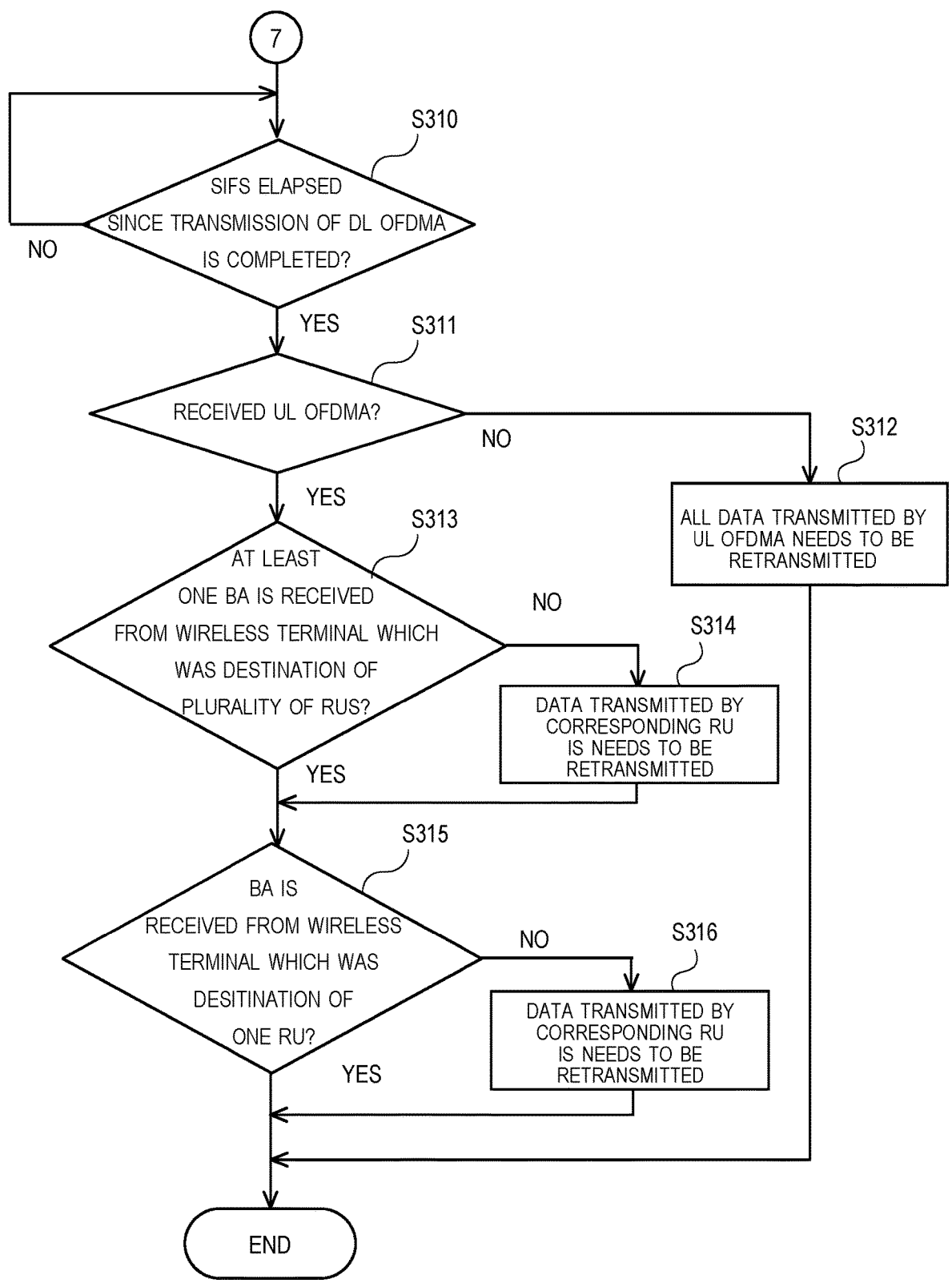
FIG. 24 is a flowchart explaining example of a process executed by the access point according to the third embodiment.

FIG. 23 and FIG. 24 shows a flowchart explaining example of a process executed by the access point according to the third embodiment. Excluding the fact that dummy data (for example, copies of HE-SIG-B in other "Widths") is stored for the HE-SIG-B in some of the "Widths", the process executed by the access point according to the third embodiment is the same as the process executed by the access point according to the second embodiment (FIG. 17 and FIG. 18).

Next, the process executed by the wireless terminal according to the third embodiment is described. The detection of resource units the destination is configured to the own device is as the same as the process of the second embodiment (FIG. 19 and FIG. 20). In the third embodiment, the frequency bandwidth used for data communication by DL OFDMA is 80 MHz. Therefore, the detection of resource units are executed for the "Third Width" and the "Fourth Width", as well.

If the wireless terminal treats the HE-SIG-B of the "Third Width" and the "Fourth Width" as dummy data, the wireless terminal can demodulate the resource units transmitted by the "First Width" and the "Second Width" with higher priority compared to the resource units transmitted by the "Third Width" and the "Fourth Width". If the wireless terminal successfully detects the User field included in the HE-SIG-B of the "First Width" or the "Second Width", the possibility that the reception of the resource unit transmitted by the "First Width" or the "Second Width" is successful would be greater.

The reception circuit of the wireless communication device (wireless terminal) according to the embodiment can receive a first physical frame transmitted by using a plurality of frequency bands. If the first physical frame includes a first physical header configured for each of the frequency bands and the first fields in the first physical header transmitted by some of the frequency bands is not referred by the device, the resource unit which is transmitted by using the same frequency band as the first header transmitted by the frequency band which is referred by the device can be demodulated with higher priority, for extracting the first data.

In the following, the resource unit which is modulated by the wireless terminal 1 and the MAC frame which is received by the wireless terminal 1 are described with reference to FIG. 21 and FIG. 22.

First, cases when the wireless terminal 1 only detects a single User field are explained. For example, if the wireless terminal 1 only detected UF1-1, the wireless terminal 1 demodulates RU31, to receive frame #1. If the wireless terminal 1 only detected UF2-4, the wireless terminal 1 demodulates RU38, to receive frame #9. If the wireless terminal 1 only detected UF3-1, the wireless terminal 1 demodulates RU39, to receive frame #10. If the wireless terminal 1 only detected UF4-4, the wireless terminal 1 demodulates RU46, to receive frame #16.

Next, cases when the wireless terminal 1 detects two User fields are explained. For example, if the wireless terminal 1 detected UF1-1 and UF3-1, the wireless terminal demodulates RU31 corresponding to UF1-1, to receive frame #1. If the wireless terminal 1 detected UF2-4 and UF4-4, the wireless terminal demodulates RU38 corresponding to UF2-4, to receive frame #9. If the wireless terminal 1 detected UF1-1 and UF2-4, the wireless terminal demodulates either RU31 corresponding to UF1-1 or RU38 corresponding to UF2-4. Thus, the priority in demodulation and reception for RU31 and RU38 would be equal. If the wireless terminal 1 detected UF1-1 and UF4-4, the wireless terminal demodulates RU31 corresponding to UF1-1, to receive frame #1.

Next, cases when the wireless terminal 1 detects three User fields are explained. If the wireless terminal 1 detected UF1-1, UF2-4 and UF3-1, the wireless terminal demodulates either RU31 corresponding to UF1-1 or RU38 corresponding to UF2-4. Thus, the priority for demodulation and reception regarding RU31 and RU38 would be equal. If the wireless terminal 1 detected UF1-1, UF2-4 and UF4-4, the wireless terminal demodulates at least either RU31 corresponding to UF1-1 or RU38 corresponding to UF2-4. The priority for demodulation and reception regarding RU31 and RU38 would be equal. If the wireless terminal 1 detected UF1-1, UF3-1 and UF4-4, the wireless terminal demodulates RU31 corresponding to UF1-1, to receive frame #1.

Finally, a case when the wireless terminal 1 detects four User fields is explained. If the wireless terminal 1 detected UF1-1, UF2-4, UF3-1 and UF4-4, the wireless terminal 1 demodulates either RU31 corresponding to UF1-1 or RU38 corresponding to UF2-4. The priority for demodulation and reception regarding RU31 and RU38 would be equal.

In the explanation of the process executed by the wireless terminal (FIG. 19 and FIG. 20), it was mentioned that either of the User fields including the AID of the own device (first fields specifying the own device as the destination) is selected (step S228). In the next step, (step S229) the resource unit (RU) corresponding to the selected User field (first field) is specified based on the relations. Therefore, the wireless communication device 200 (wireless terminal) selects the resource unit with the destination set to the own device. Then, the corresponding resource unit is demodulated. Various methods exist for selecting the User field (first field) and the resource unit. However, any method can be used for the selection.

In the following, examples of methods for selecting the User field (first field) and the resource unit are described.

For example, if the physical header of the first physical frame transmitted by using a specific frequency band includes a first field which corresponds to a resource unit transmitted by the specific frequency band and another first field which corresponds to a resource unit transmitted by another frequency band, the wireless terminal can select the former first field and the resource unit corresponding to the former first field for demodulation.

Therefore, reception circuit of the wireless terminal according to the embodiment (wireless communication device 200) can receive a first physical frame transmitted by using a plurality of frequency bands. If the first physical frame includes first physical headers configured for each frequency band, the wireless terminal can demodulate the resource unit in the frequency band the first field which specifies the own device as the destination was detected to extract the first data.

For example, if the physical header of the first physical frame transmitted by using a specific frequency band includes a first field which corresponds to a resource unit transmitted by the specific frequency band and another first field which corresponds to a resource unit transmitted by another frequency band, the wireless terminal can select the later first field and the resource unit corresponding to the later first field for demodulation.

The processing circuit (hardware circuit) of the access point according to the embodiment (wireless communication device 100) can configure a plurality of first fields in the first physical header. The first field can specify the destination of either of the resource units included in a plurality of frequency bands including the frequency band the first physical header is being transmitted. Therefore, the resource unit corresponding to the first field can be transmitted by using a different frequency band from the physical header including the first field.

The wireless terminal (wireless communication device 200) which receives the first physical header transmitted by the transmission circuit of the access point (wireless communication device 100) can modulate the resource unit transmitted by a frequency band which is different from the physical header including the first field specifying the own device as the destination, to extract the transmitted first data.

The reception circuit of the wireless communication device (wireless terminal) according to the embodiment can receive a first physical frame transmitted by using a plurality of frequency bands. If the first physical frame includes a first physical header configured for each of the frequency band and the detected first field specifies the own device as the destination while the corresponding resource unit is transmitted by a different frequency band, the resource unit transmitted by the different frequency band can be demodulated to extract the first data.

Fourth Embodiment

In the above embodiments, the access point assigned a single AID to each of the wireless terminals. For example, the access point assigned AID=1 to the wireless terminal 1. In the fourth embodiment, the access point can assign a plurality of AIDs to each of the wireless terminals.

For example, the access point 11 can assign four AIDs (AID=1, 5, 6 and 7) to the wireless terminal 1. Also, the access point 11 can assign priorities to each number and the notify the priorities to the wireless terminal 1. If the wireless terminal 1 detects are plurality of User fields when a DL OFDMA is received, the resource unit which is demodulated and received is selected based on the priorities.

Figure 25:
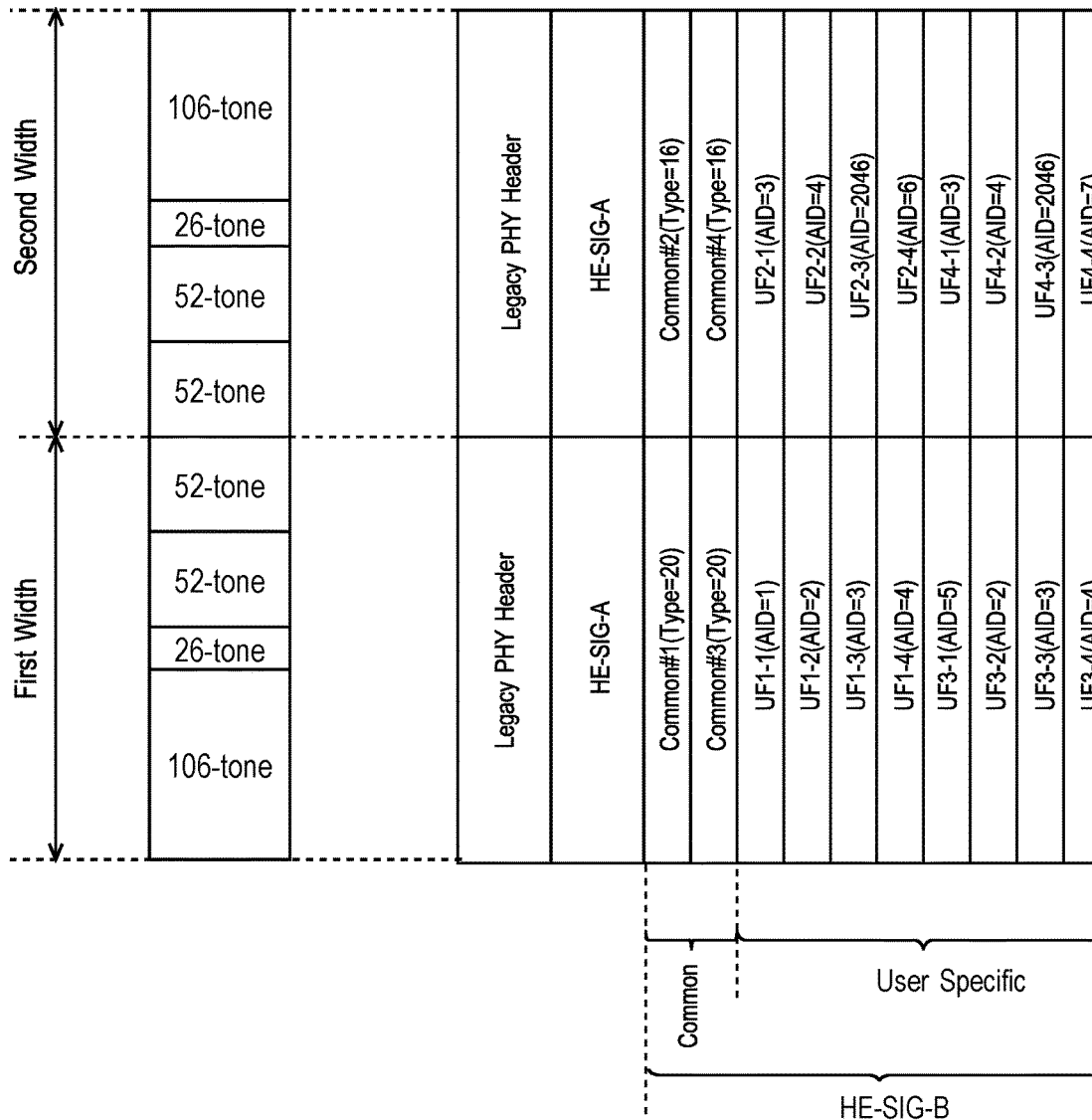
FIG. 25 is an example of HE-SIG-B in DL OFDMA according to a fourth embodiment.

FIG. 25 is an example of HE-SIG-B in DL OFDMA according to a fourth embodiment. Suppose that the access point 11 configured the priorities of AIDs for the wireless terminal 1 in the order of 1, 5, 7 and 6. The access point 11 can transmit a management frame to notify the priorities of the AIDs.

In the following, a process for selecting the resource unit to be demodulated, when priorities are assigned to the AIDs is explained. In each of the following cases, the MAC frame transmitted by the demodulated resource unit is received.

First, cases when the wireless terminal 1 detects two User fields are explained.

For example, if the wireless terminal 1 detected UF1-1 (AID=1) and UF3-1 (AID=5), UF1-1 with the higher priority AID=1 is selected. Then, the wireless terminal 1 demodulates the resource unit corresponding to UF1-1. If the wireless terminal 1 detected UF2-4 (AID=6) and UF4-4 (AID=7), UF4-4 with the higher priority AID=7 is selected. Then, the wireless terminal 1 demodulates the resource unit corresponding to UF4-4.

If the wireless terminal 1 detected UF1-1 (AID=1) and UF2-4 (AID=6), UF1-1 with the higher priority AID=1 is selected. Then, the wireless terminal 1 demodulates the resource unit corresponding to UF1-1. If the wireless terminal 1 detected UF1-1 (AID=1) and UF4-4 (AID=7), UF1-1 with the higher priority AID=1 is selected. Then, the wireless terminal 1 demodulates the resource unit corresponding to UF1-1.

Next, cases when the wireless terminal 1 detects three User fields are explained.

For example, if the wireless terminal 1 detected UF1-1 (AID=1) and UF2-4 (AID=6) and UF3-1 (AID=5), UF1-1 with the highest priority AID=1 is selected. Then, the wireless terminal 1 demodulates the resource unit corresponding to UF1-1. If the wireless terminal 1 detected UF1-1 (AID=1) and UF2-4 (AID=6) and UF4-4 (AID=7), UF1-1 with the highest priority AID=1 is selected. Then, the wireless terminal 1 demodulates the resource unit corresponding to UF1-1. If the wireless terminal 1 detected UF1-1 (AID=1) and UF3-1 (AID=5) and UF4-4 (AID=7), UF1-1 with the highest priority AID=1 is selected. Then, the wireless terminal 1 demodulates the resource unit corresponding to UF1-1.

Finally, cases when the wireless terminal 1 detects four User fields are explained.

For example, if the wireless terminal 1 detected UF1-1 (AID=1) and UF2-4 (AID=6), UF3-1 (AID=5) and UF4-4 (AID=7), UF1-1 with the highest priority AID=1 is selected. Then, the wireless terminal 1 demodulates the resource unit corresponding to UF1-1.

When the access point transmits a DL OFDMA to the wireless terminal, the access point can configure the priorities of the AIDs based on the communication history of the resource units. Namely, the User fields corresponding to resource units the success rate of reception was high can have higher priorities. Thereby, it is possible to improve the possibility that each wireless terminal successfully receives the MAC frame.

Fifth Embodiment

In the above embodiments, if the wireless terminal detected a plurality of User fields in the DL OFDMA, the wireless terminal demodulated the resource unit corresponding to either of the User fields. However, if the wireless terminal detects a plurality of User fields, the wireless terminal can receive the MAC frames transmitted by the resource units corresponding to the plurality of User fields using maximum ratio combining. The wireless terminal according to the fifth embodiment receive MAC frames transmitted by the resource units using maximum ratio combining.

The wireless terminal which executes maximum ratio combining ensures that the SNR (Signal-to-Noise Ratio) is maximized by adjusting and combining the amplitudes and the phases of the signals received by different resource units (sets of subcarriers). The resource units used for maximum ratio combining are used for transmission of MAC frames with the same data content.

In the example of FIG. 16, trigger #1 and data #1 is transmitted to the wireless terminal 1 by using RU21. Here, trigger #1 is a Trigger frame. Data #1 is a data frame. Also, by using RU28, trigger #2 and data #1 is transmitted to the wireless terminal. Here, trigger #2 is a Trigger frame. If maximum ratio combining is applied to RU21 and RU28, both of the resource units need to include trigger #1, trigger #2 and data #1, respectively.

If the reception circuit of the wireless communication device according to the embodiment (wireless terminal) detects a plurality of first fields which specify the own device as the destination of a resource unit, the processing circuit (hardware circuit) can apply maximum ratio combining to at least two of the resource units corresponding to the first fields to extract data. The number of resource units maximum ratio combining is applied is not limited. Also, the order of maximum ratio combining is not limited. The combination of resource units maximum ratio combining is applied is not limited.

The wireless communication device (wireless terminal) described in the embodiment demodulates a plurality of resource units. The wireless communication device can determine the number of resource units which are demodulated based on the resource units which are used for maximum ratio combining. If the wireless communication device does not execute maximum ratio combining, the wireless communication device can demodulate the resource units corresponding to either of the User fields which specify the own device as the destination device. Thus, the resource units corresponding to the other User fields do not have to be demodulated.

Sixth Embodiment

In the above embodiments except the fifth embodiment, if the wireless terminal detected a plurality of User fields in the DL OFDMA, the wireless terminal demodulated the resource unit corresponding to either of the User fields. Therefore, the wireless terminals selected the resource unit corresponding to the User fields. In the sixth embodiment, the results of the CRC check of the User fields received by each "Width" is used as the criteria. For example. the number of positives and negatives in the CRC check can be counted.

Suppose that the results of CRC check for UF1-2, UF1-2, UF1-3 and UF1-4 all received by the "First Width" were positive. However, the result of CRC check for UF2-1 was negative while the result of CRC checks for UF2-2, UF2-3 and UF2-4 were positive. Here, UF2-1, UF2-2, UF2-3 and UF2-4 are received by the "Second Width". In the above example, the CRC checks for the "First Width" had more positives while the number of negatives was smaller. Therefore, the wireless terminal may select the resource unit corresponding to the User field received in the "First Width".

The reception circuit of the wireless communication device (wireless terminal) according to the embodiment can receive a first physical frame transmitted by using a plurality of frequency bands. If the first physical frame includes a first physical header configured for each of the frequency band and resource units corresponding the first field specifying the own device as the destination are in a plurality of frequency bands, the resource unit transmitted by using the frequency band with the smaller number of errors detected by the error correction code or the error detection code for the first field can be demodulated with higher priority.

Seventh Embodiment

The wireless terminal according to the third embodiment used the control data in the HE-SIG-B received in the "First Width" and the "Second Width". However, the HE-SIG-B received in the "Third Width" and the "Fourth Width" were treated as dummy data. However, the wireless terminal does not necessary have to treat the HE-SIG-B received by frequency bands ("Widths") other than the "First Width" and the "Second Width" as dummy data. The wireless communication device according to the seventh embodiment uses the control data stored in the HE-SIG-B received within the 80 MHz bandwidth frequency band ("First Width" to the "Fourth Width").

If the wireless terminal according to the seventh embodiment detects UF1-1 in the "First Width", the frame stored in the resource unit corresponding to UF1-1 is received. Also, if the wireless terminal detects UF2-4 in the "Second Width", the frame stored in the resource unit corresponding to UF2-4 is received. If the wireless terminal detects UF3-1 in the "Third Width", the frame stored in the resource unit corresponding to UF3-1 is received. If the wireless terminal detects UF4-4 in the "Fourth Width", the frame stored in the resource unit corresponding to UF4-4 is received.

The access point (wireless communication device) according to the above embodiments uses different sets of subcarriers (resource units) to transmit data to the same wireless terminal. The wireless terminal demodulates the physical payload transmitted by using the set of subcarriers the modulation of the control data was successful to receive the data transmitted by the set of subcarriers.

By using the above embodiments, even when the condition of propagation path is poor due to factors including phasing, noise or interference, the frequency band the quality of the propagation path is relatively better can be used for communication of data. Therefore, it is possible to prevent the overall performance of the wireless communication system from degrading due to repeated transmission of the same data. Also, the above embodiments enable higher reliabilities for data communication in wireless communication networks such as wireless LAN. By using high reliability wireless communication networks the monitoring and control of critical infrastructure becomes possible. Thus, stable operation of critical infrastructure and the continuation of economic activities is realized.

Eighth Embodiment

In the present embodiment, [1] frame types in the wireless communication system, [2] disconnecting between wireless communication devices, [3] access to the wireless LAN system and [4] a frame interval of a wireless LAN are described.

[1] Frame Types in the Wireless Communication System

As mentioned above, the frames used by a wireless access protocol of the wireless communication system are divided roughly into three categories; the data frame, the management frame and the control frame. These categories are generally indicated in the header part of frames. The frame type can be indicated using one field or by using a combination of two fields. In the IEEE 802.11 standard, the frame type is identified by using two fields; the Type field and the Subtype field of the Frame Control field in the header part of the MAC frame. The Type field is generally used for classifying frames into data frames, management frames, or control frames. The Subtype field is used for identifying more detailed types including frame types such as a beacon frame which is a type of the management frame.

The management frames are frames used to manage physical communication links with different wireless communication devices. For example, there are frames used to configure communication settings with other wireless communication devices. Also, there are frames used for releasing communication links (disconnecting links). There are frames used for executing power saving operations of the wireless communication device.

The data frames are frames used for transmitting data generated by the wireless communication device to other wireless communication devices. To transmit a data frame, the physical communication link with another wireless communication device needs to be established. The transmitted data is generated in a higher layer of the present embodiment. For example, data is generated by a user's operation.

The control frames are frames used to execute control processes during transmission and reception (exchange) of the data frame with different wireless communication devices. A response frame transmitted for the ACKnowledgment when the wireless communication device receives the data frame or the management frame is a type of a control frame. Examples of the response frame include ACK frames or BlockACK frames. RTS frames and CTS frames also fall into the category of control frames.

The three types of frames are processed in the physical layer and transmitted as physical packets from an antenna. In the IEEE 802.11 standard (including standards such as IEEE Std 802.11ac-2013), an association process is defined as one of the procedures for establishing connections. The association request frame and the association response frame used in this procedure are management frames. The association request frames and the association response frames are management frames transmitted in a unicast scheme. The wireless communication terminals receiving these frames transmit ACK frames as response frames.

[2] Disconnecting Between Wireless Communication Devices

Explicit methods and implicit methods exist for disconnection between the wireless communication devices. In the explicit method, a frame used for disconnecting with any one of the connected wireless communication devices is transmitted. One example of such frames is the Deauthentication frame defined in IEEE 802.11 standard. The Deauthentication frame falls into the category of the management frames. Normally, it is determined that the connection is released when the frame is transmitted for disconnecting with a wireless communication device, in the transmitting side. In the receiving side, it is determined that the connection is released when the frame for disconnecting is received. When the connection is released, the wireless communication device returns to the initial state of communication. In the initial state, the wireless communication device searches for another wireless communication device which is a potential communicating partner, for example.

When the wireless communication base station disconnects with a wireless communication terminal, the base station deletes information of the wireless communication device from a connection management table. If the wireless communication base station assigns AIDs to each wireless communication terminal which joins the BSS in the association process, assignment information to the AID is deleted. Then, the released AID can be assigned to wireless communication device which join the BSS.

In the implicit method, disconnection is determined when transmission of a frame (transmission of a data frame, management frame or transmission of a response frame corresponding to the frame transmitted by the subject device) is not detected from the partner wireless communication device. Disconnection is such cases are allowed because there are cases when it is not possible to receive radio signals or decode signals due to large distances with the partner wireless communication device and maintain links. In such cases, the reception of frames for disconnecting cannot be expected.

One way to implement the implicit method is, by using a timer. When a data frame that requests an acknowledgment response frame is transmitted, a first timer (for example, a retransmission timer for a data frame) that limits the retransmission period of the frame is activated. If the acknowledgement response frame corresponding to the data frame is not received, the data frame is retransmitted until the first timer expires (until the retransmitted period elapses). When the acknowledgment response frame to the frame is received, the first timer is stopped.

When the acknowledgment response frame is not received before the expiration of the first timer, a management frame which confirms whether the wireless communication device of the connection partner is still present (within the communication range) is transmitted. In the same time, a second timer (for example, a retransmission timer for the management frame) which limits the retransmission period of the frame is activated. The second timer is used similarly to the first timer. If an acknowledgment response frame to the frame is not received, the management frame is retransmitted until the expiration of the second timer. When the second timer expires, it is determined that the connection is lost.

Another method is use of a third timer. The third timer is activated when a frame is received from a wireless communication device of the connection partner. The third timer is stopped every time the frame is newly received from the wireless communication device of the connection partner. The third timer is activated from the initial value again. When the third timer expires, a management frame which confirms whether the wireless communication device of the connection partner is still present (within the communication range) is transmitted. In the same time, a second timer (for example, a retransmission timer for the management frame) which limits the retransmission period of the frame is activated. If an acknowledgment response frame to the frame is not received, the frame is retransmitted until the expiration of the second timer. When the second timer expires, it is determined that the connection is lost.

The management frame used to confirm whether the wireless communication device of the connection partner is still present in the later case may be different from the management frame used in the former case. The timer to limit the period when retransmission of the management frame is permitted can be the second timer used in the first case or a different timer.

[3] Access to the Wireless LAN System

In wireless LAN systems, communication with a plurality of wireless communication devices is possible. However, in some cases access to the wireless LAN system turn out to be competing. In IEEE802.11 (including successor standards or the like) wireless LAN, CSMA/CA provides the basis of access. For example, suppose that transmission of data by a certain wireless communication device is detected by a wireless communication device and the device starts to transmit a different data after a certain period elapsed after the transmission of data is completed. In such cases, plurality of wireless communication devices which detected the transmission would transmit different data, simultaneously. Then a plurality of radio signals would collide, making transmission of frames a failure.

By having each wireless communication device detect transmission of data by other wireless communication devices and waiting for a random time after the transmission of data is completed, the timing when the transmission of next data is dispersed stochastically. Thus, the wireless communication device which has obtained the smallest random time can transmit frames successfully without the risk of collision. Since the authority to transmit data is allocated to a plurality of wireless communication devices randomly, methods which use Carrier Avoidance are suitable for sharing the wireless communication medium fairly across a plurality of wireless communication devices.

[4] Frame Interval of Wireless LAN

The frame interval of IEEE802.11 wireless LAN is described. There are several types of frame intervals used in IEEE802.11 wireless LAN including distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN. The precise time which elapsed since the previous frame is not used as the definition. Therefore, the definition used here follows that of the IEEE802.11 wireless LAN system. In IEEE802.11 wireless LAN, a waiting time at the time of random access based on CSMA/CA is assumed to be the sum of a fixed time and a random time. Such a definition is used to distinguish the fixed time.

DIFS and AIFS are frame intervals used when initiating exchange of frames using CSMA/CA in a contention period when there is competition with other wireless communication devices. DIFS is used in cases when priority according to the traffic type is not distinguished. AIFS is used in cases when priority by traffic identifier (TID) is provided.

Since the executed process is similar for DIFS and AIFS, the explanation below will refer mainly to AIFS. In IEEE802.11 wireless LAN, access control including the starting of frame exchanges in the MAC layer is performed. If QoS (Quality of Service) is supported for data transferred from a higher layer, the traffic type is notified together along the data. The data is classified according to priority based of the traffic type at the time of access. The classification at the time of this access is referred to as "access category (AC)". Therefore, the value of AIFS is provided for each access category.

PIFS is a period is shorter than the values of DIFS and AIFS, which is a frame interval that enables access which is more preferential than other competing wireless communication devices. SIFS is a frame interval which is used for transmitting responding control frames or in cases when burst transmission is executed in frame exchange after the authority for access is acquired. EIFS is a frame interval used when reception of a frame fails (when it is determined that the received frame is in error state).

RIFS is a frame interval which is used in cases when a plurality of frames is transmitted consecutively to the same wireless communication device (burst transmission) after the authority for access is acquired. Transmission of response frames from the receiving wireless communication is not required when RIFS is used.

Suppose that it is determined that the medium is busy (used) as a result of carrier sensing, when a transmission request of a data frame (W_DATA1) is generated by a wireless communication device. In this case, from the time when the carrier sensing detects idle, the wireless communication device waits for AIFS which is a fixed time. Then, the wireless communication device waits for a random time (random backoff) before transmitting the data frame W_DATA1 to the destination device.

The random time is calculated by multiplying a slot time with a pseudorandom integer which is obtained from an uniform distribution between contention windows (CW) including numbers between 0 and some integer. Here, the product of CW and the slot time is called the "CW time width". The initial value of CW is defined as CWmin. The value of CW is increased every time data is retransmitted until CW reaches CWmax. Both CWmin and CWmax have values for each access category.

The wireless communication device which is the destination device of W_DATA1, transmits a response frame (W_ACK1) after period defined in SIFS elapses after the communication medium becomes vacant, if the reception of the data frame is successful and the corresponding data frame is a frame which requires the transmission of a response frame. The wireless communication device which transmitted W_DATA1 can transmit the next frame (for example, W_DATA2) after period defined in SIFS elapses after the communication medium becomes vacant, if W_ACK1 is received and it is within the transmission burst time limit.

AIFS, DIFS, PIFS and EIFS are functions of SIFS and the slot-time. The values of SIFS and the slot time are defined for each physical layer. Parameters with values assigned for each access category include AIFS, CWmin and CWmax. These values can be configured for each communication group (which is a basic service set (BSS) in IEEE802.11 wireless LAN). Nonetheless, default values are defined.

For example, suppose that SIFS is 16 μs and the slot time is 9 μs in the 802.11ac standard. In such case, PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS is the sum of SIFS, DIFS, and the time length of a response frame transmitted at the lowest physical rate. In wireless communication devices which can utilize EIFS efficiently, it is possible to estimate the duration of a physical packet which includes the response frame corresponding to the frame which launched EIFS. In such cases, EIFS is the sum of the estimated duration, SIFS and DIFS Note that the frames described in the above embodiments may indicate packets in the IEEE 802.11 standard or successor standards, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A wireless communication device comprising:
   reception circuitry configured to:
      receive a first physical frame including a first physical payload and a first physical header, the first physical payload transmitting first data by using resource units which are partitions of a frequency band and the first physical header transmitted in the frequency band;
detect a first field from the first physical header, the first field specifying destination for either of the resource units;
demodulate the first physical payload in at least either of the resource units corresponding to a plurality of first fields which specify the wireless communication device as the destination of the resource unit; and
extract the first data; and
processing circuitry configured to determine a type of a MAC (Medium Access Control) frame included in the extracted first data, wherein
the reception circuitry is configured to:
receive the first physical frame transmitted by using a plurality of frequency bands;
demodulate the first physical payload in the resource unit transmitted in the frequency band referred to in the first field with a higher priority compared to the resource unit transmitted in the frequency band not referred to in the first field, if the first physical frame includes the first physical headers for each of the frequency bands; and
extract the first data.

2. A wireless communication device comprising:
reception circuitry configured to:
receive a first physical frame including a first physical payload and a first physical header, the first physical payload transmitting first data by using resource units which are partitions of a frequency band and the first physical header transmitted in the frequency band;
detect a first field from the first physical header, the first field specifying destination for either of the resource units;
demodulate the first physical payload in at least either of the resource units corresponding to a plurality of first fields which specify the wireless communication device as the destination of the resource unit; and
extract the first data; and
processing circuitry configured to determine a type of a MAC (Medium Access Control) frame included in the extracted first data, wherein
the reception circuitry is configured to:
receive the first physical frame transmitted by using a plurality of frequency bands;
demodulate the first physical payload in the resource unit transmitted in the frequency band with a smaller number of errors detected by an error correction code or an error detection code for the first field with a higher priority if the first physical frame includes the first physical headers for each of the frequency bands; and
extract the first data.

3. A wireless communication device comprising:
reception circuitry configured to:
receive a first physical frame including a first physical payload and a first physical header, the first physical payload transmitting first data by using resource units which are partitions of a frequency band and the first physical header transmitted in the frequency band;
detect a first field from the first physical header, the first field specifying destination for either of the resource units;
demodulate the first physical payload in at least either of the resource units corresponding to a plurality of first fields which specify the wireless communication device as the destination of the resource unit; and
extract the first data; and
processing circuitry configured to determine a type of a media access control (MAC) frame included in the extracted first data, wherein
the processing circuitry is configured to extract the first data by applying maximum ratio combining to at least two of the resource units, if the reception circuitry detected a plurality of first fields which specify the wireless communication device as the destination.

4. A wireless communication device comprising:
transmission circuitry configured to transmit a physical frame including a physical header and one or more physical payloads, the one or more physical payloads including MAC (Medium Access Control) frames, the MAC frames including at least one trigger frame and at least one data frame, wherein the physical header is transmitted in a frequency bandwidth, and the one or more physical payloads are transmitted by using a plurality of resource units which are parts of the frequency bandwidth;
processing circuitry; and
reception circuitry, wherein
the processing circuitry is configured to determine a receiving device required to use two or more of the resource units for transmission as a specific receiving device, and two or more MAC frames destined to the specific receiving device are transmitted via two or more of the resource units,
the physical header includes first fields corresponding to the plurality of resource units, and identification of the specific receiving device is included in two or more of the first fields corresponding the resource units used for the specific receiving device,
the at least one trigger frame destined to the specific receiving device includes information instructing to transmit at least one response frame including acknowledgement information for the at least one data frame via same resource units as the resource units via which the specific receiving device receives the MAC frames,
the reception circuitry is configured to receive the at least one response frame from the specific receiving device via the resource units instructed by the at least one trigger frame, in an uplink multiplexing,
the processing circuitry is configured to determine whether the at least one data frame is retransmitted based on acknowledgment information included in at least successfully received the at least one response frame from the specific receiving device, and
the transmission circuitry is configured to retransmit the at least one data frame if the at least one data frame is determined to be retransmitted.

5. The wireless communication device according to claim 4, wherein the processing circuitry is configured to determine numbers of resource units used for transmission to the specific receiving device based on information on numbers of resource units usable for the specific receiving device.

6. The wireless communication device according to claim 4, wherein the processing circuitry is configured to determine whether two or more resource units are required for transmission to the specific receiving device based on information including whether two or more resource units are required for transmission to the specific receiving device.

7. A wireless communication device comprising:
reception circuitry configured to:
- receive a first physical frame including a first physical payload and a first physical header, wherein the first physical payload transmits first data including MAC (Medium Access Control) frames by using resource units which are parts of a frequency bandwidth, the first physical header being transmitted in the frequency bandwidth, the physical header including first fields corresponding to the resource units, the first fields specifying destination for either of the resource units;
- search for a first field specifying the wireless communication device as the destination from the first physical header and stop searching for the first field if one first field specifying the wireless communication device as the destination is detected; and
- demodulate the first physical payload in at least either of the resource units corresponding to the first fields; and extract the first data; and processing circuitry configured to determine a type of a MAC frame included in the extracted first data.

8. The wireless communication device according to claim 7, wherein the reception circuitry is configured to continue to search for the first field even if the one first field specifying the wireless communication device as the destination is detected.

9. The wireless communication device according to claim 8, wherein the reception circuitry is configured to memorize only one of the first fields detected if a plurality of the first fields specifying the wireless communication device as the destination are detected.

* * * * *